United States Patent [19]
Kosako

[11] Patent Number: 5,822,626
[45] Date of Patent: Oct. 13, 1998

[54] REAL IMAGE TYPE OF FINDER

[75] Inventor: Kosei Kosako, Tokyo, Japan

[73] Assignee: Asahi Kogaku Kogyo Kabushiki Kaisha, Tokyo, Japan

[21] Appl. No.: 777,963

[22] Filed: Dec. 24, 1996

[30] Foreign Application Priority Data

Dec. 26, 1995 [JP] Japan .................................... 7-339100

[51] Int. Cl.⁶ ........................... G03B 13/04; G03B 13/10; G03B 13/14
[52] U.S. Cl. .............................. 396/84; 396/88; 396/296; 396/377; 396/379; 396/386; 396/382
[58] Field of Search .............................. 396/84, 379, 378, 396/377, 382, 384, 386, 88, 296

[56] References Cited

U.S. PATENT DOCUMENTS

| | | |
|---|---|---|
| 4,831,399 | 5/1989 | Tsurukawa et al. ..................... 396/377 |
| 4,967,219 | 10/1990 | Morisawa et al. . |
| 5,122,820 | 6/1992 | Pagano et al. . |
| 5,250,969 | 10/1993 | Abe et al. . |
| 5,296,877 | 3/1994 | Sato . |
| 5,335,030 | 8/1994 | Suzuka . |
| 5,345,287 | 9/1994 | Taguchi . |
| 5,463,438 | 10/1995 | Kosako . |
| 5,628,037 | 5/1997 | Tsuyuki et al. ......................... 396/377 |

*Primary Examiner*—W. B. Perkey
*Attorney, Agent, or Firm*—Greenblum & Bernstein P.L.C.

[57] ABSTRACT

A viewfinder has an objective optical system and an eyepiece optical system. The viewfinder includes a supporting member which supports at least a part of either the objective optical system or the eyepiece optical system. The viewfinder further includes a hollow member provided separately from the supporting member. The hollow member is positioned in an optical path of the viewfinder such that a focal plane of the objective optical system is located in the hollow member. The viewfinder further includes a first transparent member secured to one end of the hollow member so as to face toward the objective optical system, and a second transparent member secured to another end of the hollow member so as to face toward the eyepiece optical system. An enclosed space in which the focal plane is located is formed by the first transparent member, the second transparent member and the hollow member.

29 Claims, 20 Drawing Sheets

REAL IMAGE TYPE OF FINDER

BACKGROUND OF THE INVENTION

1. Field of the Invention

The present invention relates to a real image type of finder.

2. Description of the Related Art

A real image type of finder having an objective optical system and an eyepiece optical system is well known. The image of a subject to be photographed which is formed through the objective optical system is observed through the eyepiece optical system. In such a real image type of finder, where there is dust in the vicinity of a focal plane on which the image of a subject to be photographed is formed, the dust and the subject image are simultaneously observed in the visual field of the finder. This may prevent a photographer from clearly observing the subject image.

In order to overcome such a problem, all the existing gaps on the finder could be sealed so as to make a dust-proof finder. However, since the finder has a complicated structure, in practice it is very difficult to firmly seal all the gaps.

A real image type of finder provided with a parallax adjusting mechanism is also well known. In this type of finder an optical element in the finder optical system is moved for adjustment to reduce or eliminate a parallax. It is much more difficult to firmly seal all the existing gaps on the finder, especially a gap or gaps on a moving part of the parallax adjusting mechanism. For this reason, a real image type of finder provided with a parallax adjusting mechanism or the like, in which dust is surely prevented from entering the finder in the vicinity of the focal plane with a simple sealing structure, has not previously been produced.

SUMMARY OF THE INVENTION

The primary object of the present invention is to provide a real image type of finder having an objective optical system and an eyepiece optical system, in which the image of a subject to be photographed which is formed through the objective optical system, is observed through the eyepiece optical system, having a simple sealing structure which prevents dust from entering the finder in the vicinity of the focal plane.

To achieve the object mentioned above, according to the present invention, there is provided a viewfinder having an objective optical system, and an eyepiece optical system. A viewfinder includes, a supporting member which supports at least a part of either the objective optical system or the eyepiece optical system, and a hollow member provided separately from the supporting member. The hollow member is positioned in an optical path of the viewfinder such that a focal plane of the objective optical system is located in the hollow member. A first transparent member is secured to one end of the hollow member so as to face toward the objective optical system and a second transparent member is secured to another end of the hollow member so as to face toward the eyepiece optical system. Thus, an enclosed space in which the focal plane is located is formed by the first transparent member, the second transparent member and the hollow member.

At least one of the first and second transparent members may be a lens element, e.g., a condenser lens.

At least one of the first and second transparent members may be a transparent plate.

Preferably, the supporting member supports at least a part of the objective optical system and at least a part of the eyepiece optical system.

Preferably, the hollow member is guided in at least one direction perpendicular to an optical axis of the viewfinder. In this case, the hollow member is preferably biased in the at least one direction by a biasing member.

Preferably, the viewfinder further includes an adjusting mechanism for shifting the hollow member in the direction perpendicular to the optical axis against a biasing force of the biasing member.

Preferably, the adjusting mechanism includes an adjusting screw which contacts the hollow member.

Preferably, at least one of the first and second transparent members is secured to the hollow member through a fixing member made of an elastic material which engages with the hollow member.

Preferably, the hollow member is guided in at least one direction perpendicular to an optical axis of the finder. The hollow member is biased in one direction in the at least one direction by a biasing member integrally formed on the fixing member.

Preferably, the viewfinder further includes a first sealing member held between at least one of the first and second transparent members and the hollow member. Preferably, the first sealing member is made of an air-permeable material, so that air can enter and exit the hollow member through the first sealing member.

Preferably, the first sealing member can be held between the first transparent member and the hollow member Preferably, the first sealing member can be held between the second transparent member and the hollow member.

Preferably, the viewfinder further includes a liquid crystal display positioned in the enclosed space in the vicinity of the focal plane.

The hollow member may be provided with a slot. A flexible printed wire, an end of which is connected to the liquid crystal display, passes through the hollow member through the slot.

Preferably, the viewfinder further includes a second sealing member held between the slot and the flexible printed wire, so that air can enter and exit the hollow member through the second sealing member. Preferably, the second sealing member is made of an air-permeable material.

Preferably, the objective optical system includes at least a lens element movable along an optical axis to vary a magnification of the viewfinder.

The viewfinder is preferably used as a viewfinder for a lens shutter type of camera.

Preferably, the camera includes a zoom lens, wherein the objective optical system including at least a lens element movable along an optical axis to vary a magnification of the viewfinder in sequence with a variation of a focal length of the zoom lens.

According to another aspect of the present invention, there is provided a real image type of viewfinder having an objective optical system and an eyepiece optical system, a subject image formed by the objective optical system being observed through the eyepiece optical system. The viewfinder includes a supporting base which supports the objective optical system and the eyepiece optical system and a hollow block assembled separately from the supporting base to be positioned in an optical path of the viewfinder such that a focal plane of the objective optical system is located in the hollow block. The hollow block includes a first transparent member secured to one end of the hollow block so as to face toward the objective optical system and a second transparent member secured to another end of the hollow block so as to face toward the eyepiece optical system. An enclosed space in which the focal plane is located is formed by the first transparent member, the second transparent member and the hollow block.

The present disclosure relates to subject matter contained in Japanese Patent Application No.7-339100 (filed on Dec. 26, 1995) which is expressly incorporated herein by reference in its entirety.

BRIEF DESCRIPTION OF THE DRAWINGS

The invention will be described below in detail with reference to the accompanying drawings in which.

DESCRIPTION OF THE PREFERRED EMBODIMENT

Figure 1:
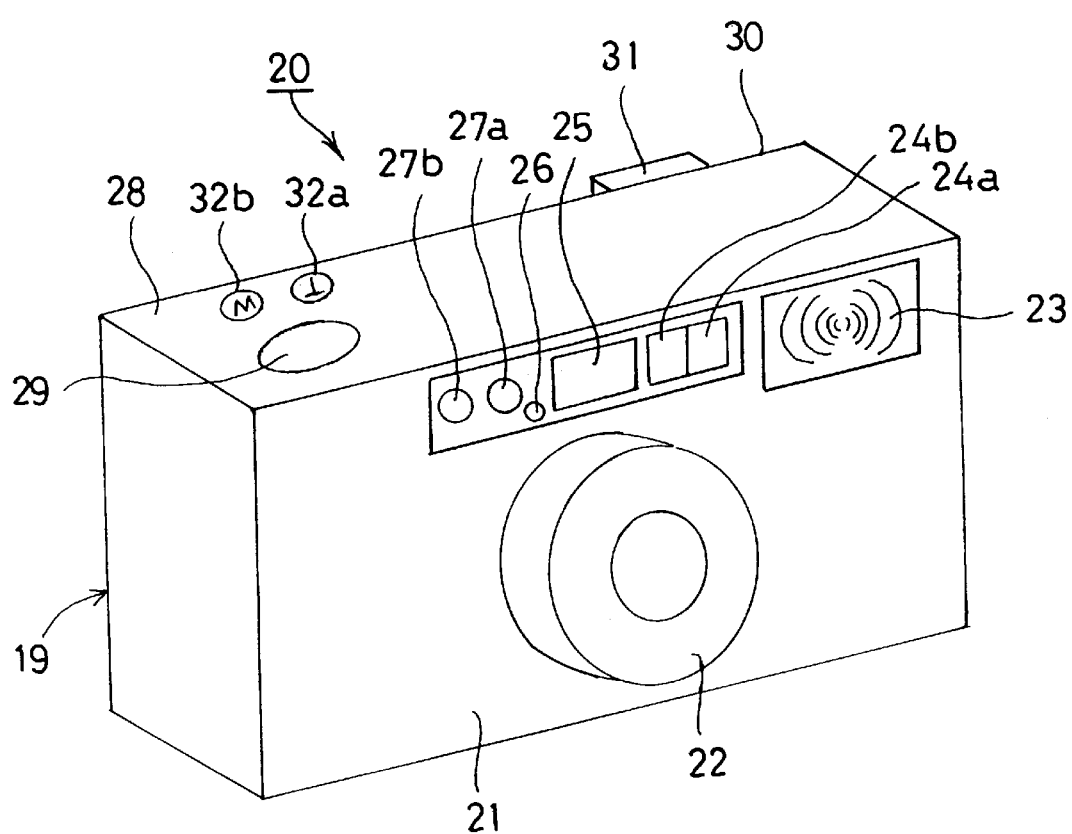
FIG. 1 is a perspective view of a lens shutter type of camera to which the present invention is applied.

FIG. 1 shows a camera 20 to which the present invention is applied. The camera 20 is a lens shutter type of camera provided with a zoom lens (photographic optical system) and a real image type of zoom finder (finder optical system). The magnification of the zoom finder varies in accordance with the variation of the focal length of the zoom lens. The camera 20 is provided at a front-middle part thereof with a photographic lens barrel 22 having the zoom lens therein.

The camera 20 is provided on a front wall 21 at an upper portion thereof with a strobe window 23, distance measuring windows 24a, 24b, a finder objective window 25, a self-timer-ON indicating window 26, and photometric windows 27a, 27b, in this order from the right side to the left side of the camera 20 as viewed in FIG. 1. The camera 10 is provided on one side of an upper wall 28 with a release button 29. The camera 10 is further provided on the upper wall 28 behind the release button 29 with a pair of zoom operational buttons 32a, 32b. The zoom operational button 32a on which the character "T" is printed is for zooming toward a telephoto extremity, while the zoom operational button 32b on which the character "W" is printed is for zooming toward a wide-angle extremity. The camera 10 is provided on a rear wall 30 at an upper-left part thereof with a finder eyepiece portion 31.

Figure 21:
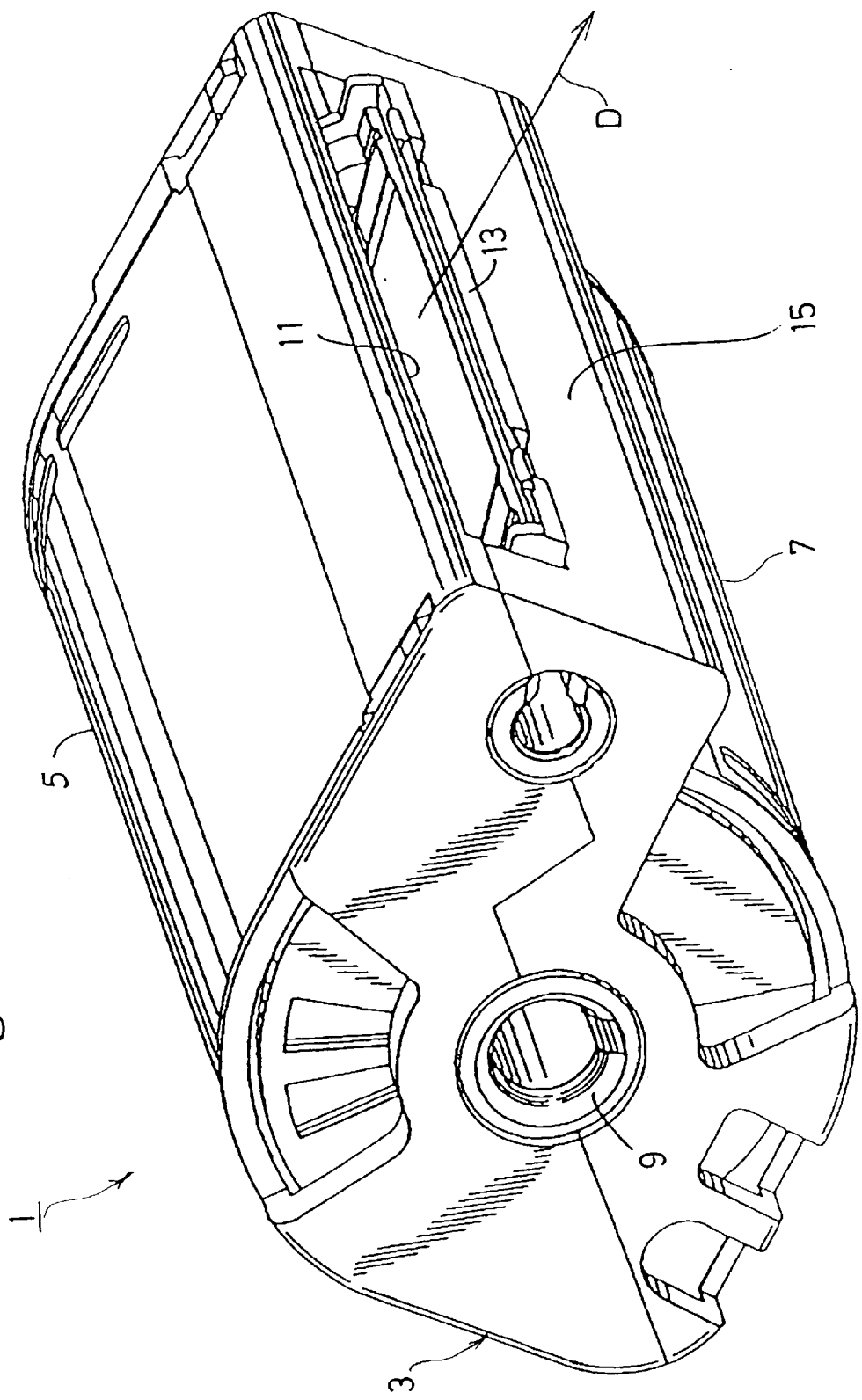
FIG. 21 is a perspective view of a film cartridge used for the lens shutter type of camera shown in FIG. 1.
Figure 22:
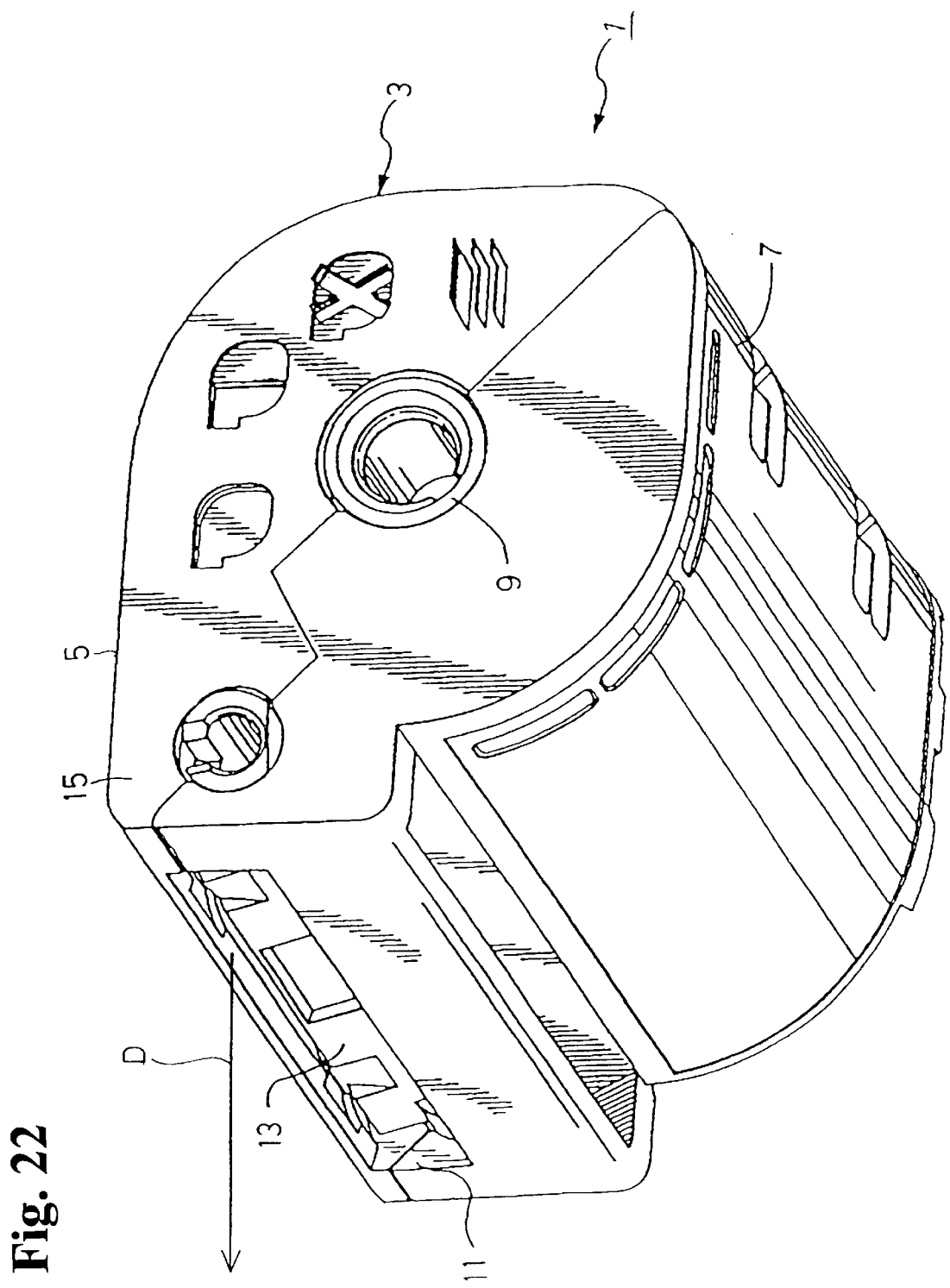
FIG. 22 is a perspective view of the film cartridge shown in FIG. 21 seen from a different angle.

In the camera 20 a particular type of film cartridge having a rolled film therein, i.e., a film cartridge 1 shown in FIG. 21 or 22, is used. The film cartridge 1 is a conventional film cartridge as disclosed in U.S. Pat. No. 5,122,820, U.S. Pat. No. 5,296,877, etc. The film cartridge is provided with a light-interceptive door for opening or closing a slot through which the film is drawn out of or retracted into the cartridge. In the film cartridge all the film including a leader or tongue is accommodated in the cartridge when not in use, and the light-interceptive door is opened and the spool in the cartridge is driven to rotate in a predetermined rotational direction to draw the film out of the cartridge when in use.

Figure 2:
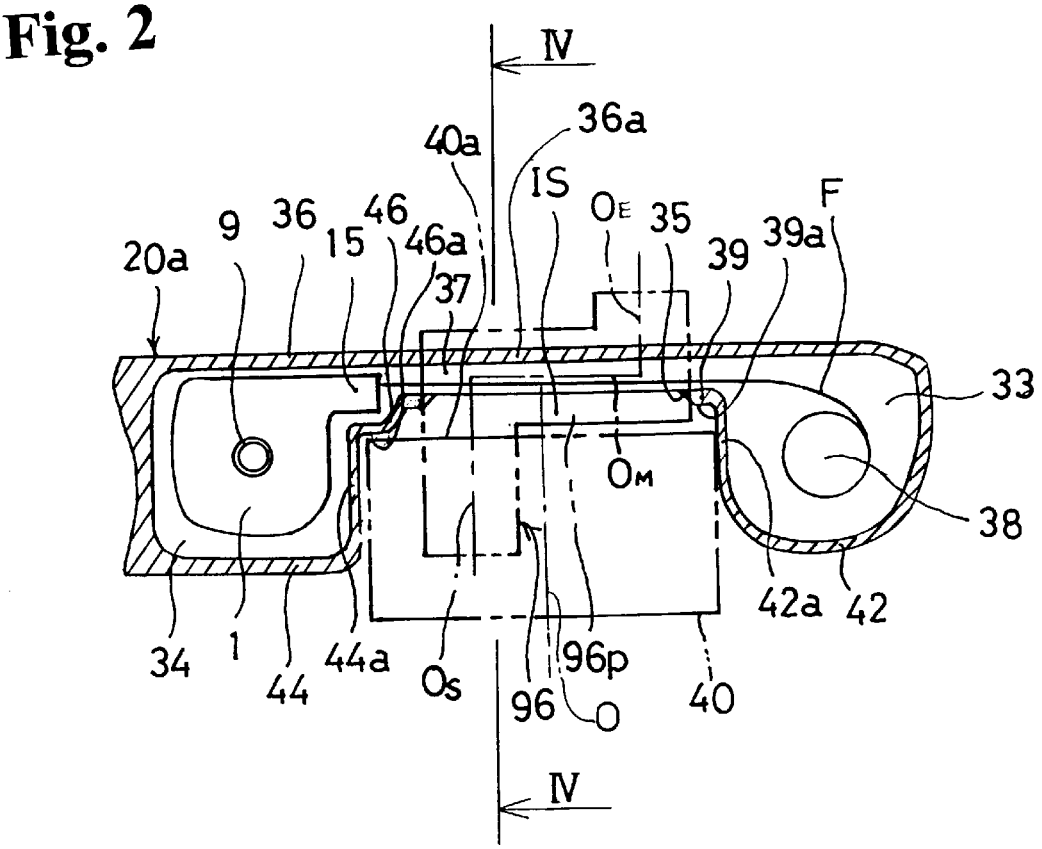
FIG. 2 is a cross sectional view of a part of the lens shutter type of camera shown in FIG. 1.

The film cartridge 1 is provided with a casing 3 consisting of a first-half casing piece 5 and a second-half casing piece 7. A spool 9 on which a film F (see FIG. 2) is rolled is accommodated in the casing 3. The casing 3 is provided with an extended portion 15 which extends in a direction D for the film F to be drawn out of the film cartridge 1. The extended portion 15 is provided on an end thereof with a slot 11 which extends parallel to an axial direction of the spool 9. The film F is drawn out of or retracted into the film cartridge 1 through the slot 11. The film cartridge 1 is provided along the slot 11 with a light-interceptive door 13 for opening or closing the slot 11.

Figure 3:
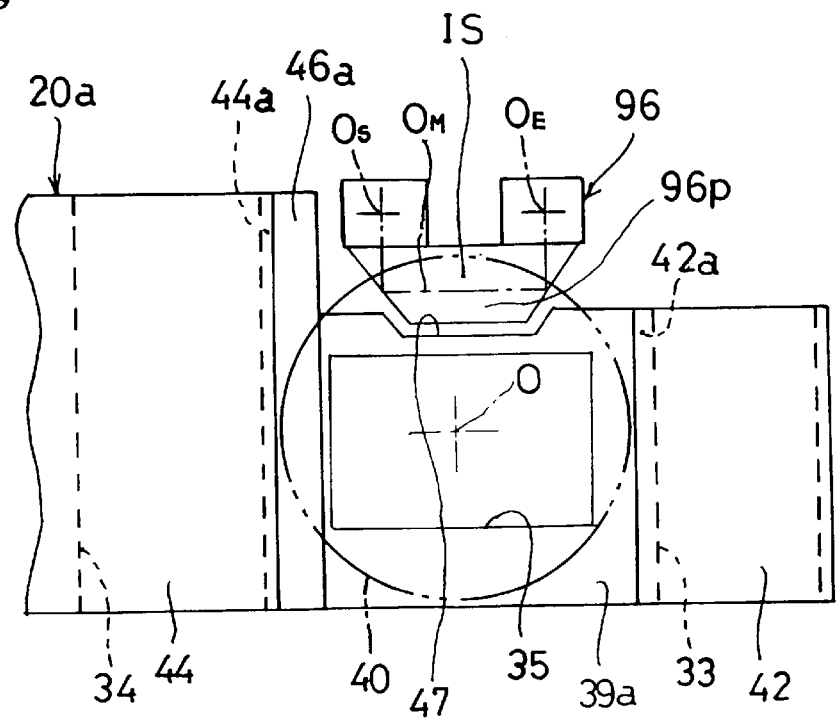
FIG. 3 is a front view of the part of the lens shutter type of camera shown in FIG. 2.
Figure 4:
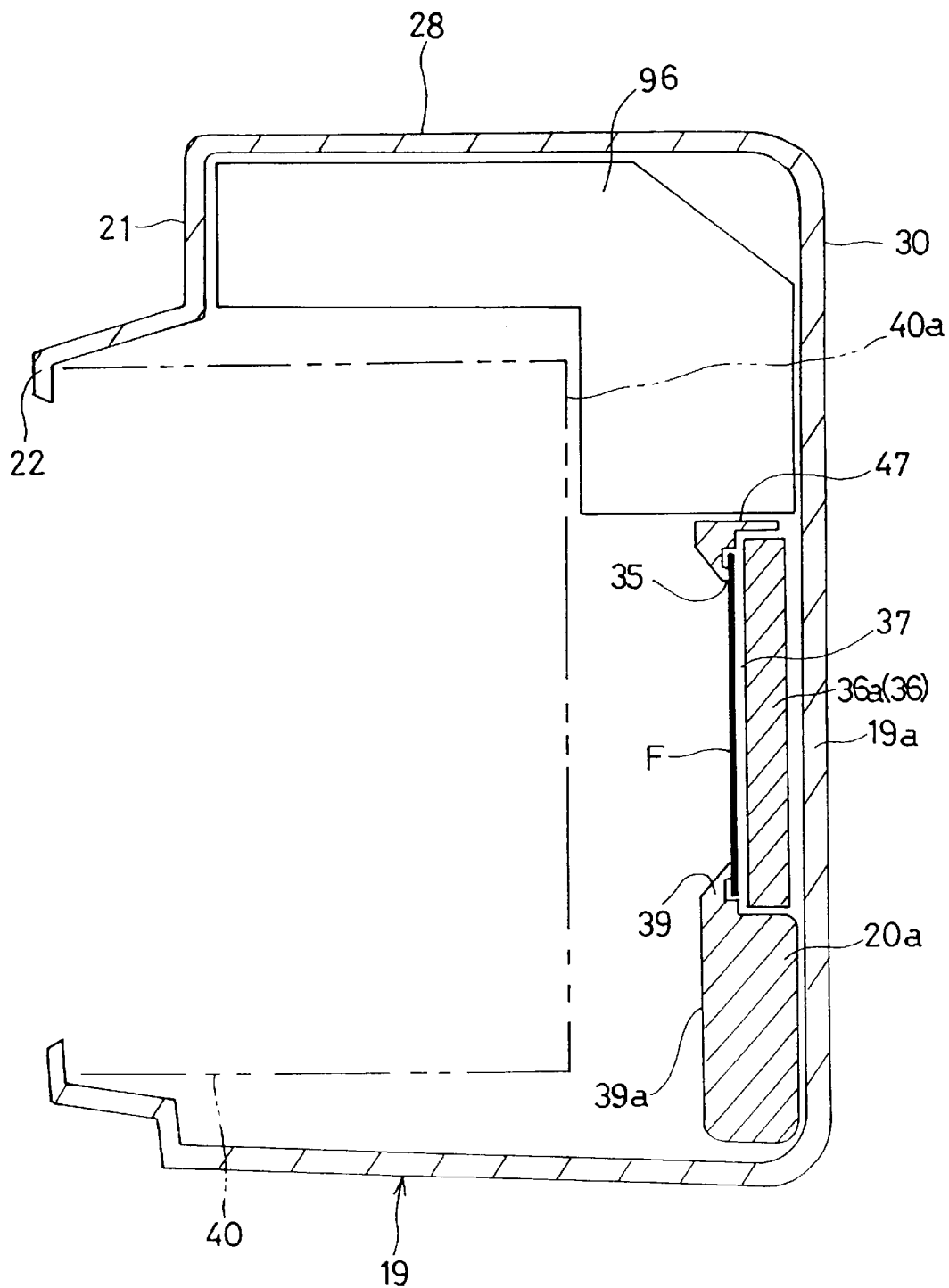
FIG. 4 is a sectional view of the lens shutter type of camera along IV—IV line shown in FIG. 2.

The camera 20 is provided with a generally box-shaped casing 19 which forms an outline of the camera 20. In the casing 19 a stationary block 20a is provided having a spool chamber 33 and a cartridge chamber 34 on the right side and the left side as viewed in FIG. 2, respectively. The stationary block 20a is provided between the spool chamber 33 and the cartridge chamber 34 with an aperture frame 39 on which a rectangular-shaped photographic aperture 35 is formed. The aperture frame 39 is integrally formed with the stationary block 20a. The vertical length of the photographic aperture 35 is shorter than the horizontal length of the same as shown in FIG. 3. As shown in FIG. 4 a pressure plate 36a is provided behind the photographic aperture 35. The pressure plate 36a is fixed on a rear wall 36 integrally formed on the stationary block 20a. The pressure plate 36a is spaced from the photographic aperture 35 by a predetermined distance to form a film leading space 37 between the pressure plate 36a and the photographic aperture 35. Behind the rear wall 36 of the stationary block 20a, a rear wall 19a of the casing 19 is positioned which extends substantially parallel to the rear wall 36 of the stationary block 20a.

The film cartridge 1 is inserted in or taken out of the cartridge chamber 34 through an opening (not shown)

formed on the bottom of the camera 20 in a predetermined direction. A film take-up spool 38 is provided in the spool chamber 33. The film take-up spool 38 takes up the film F being drawn out from the film cartridge 1 via the film leading space 37.

A photographic lens block 40 which includes the photographic lens 22 is fixed on the stationary block 20a between the spool chamber 33 and the cartridge chamber 34 in front of the photographic aperture 35. The photographic lens block 40 is positioned between an inner side wall 42a and an inner side wall 44a. The inner side wall 42a forms part of a side wall 42 forming the spool chamber 33. The inner side wall 44a forms part of a side wall 44 forming the cartridge chamber 34. The photographic lens block 40 may be any kind of photographic lens block having a conventional zoom lens therein, and therefore the photographic lens block 40 is not illustrated in detail.

The inner side wall 44a is provided at a rear end thereof with a stepped portion 46 which extends along an outline of the extended portion 15 of the film cartridge 1 toward the spool chamber 33. A front face 46a of the stepped portion 46 is located apart from a front face 39a of the aperture frame 39 in a forward direction (downward direction as viewed in FIG. 2) by a predetermined distance. The photographic lens block 40 is positioned between the inner side wall 42a and the inner side wall 44a with a part of a rear end 40a of the photographic lens block 40 being located immediately in front of the front face 46a of the stepped portion 46. Accordingly, the photographic lens block 40 is positioned such that the rear end 40a is spaced from, and in front of, the photographic aperture 35 by a predetermined distance. Due to this structure, a space IS having a predetermined volume, is formed in the casing 19 between the rear end 40a and the rear wall 19a.

In the camera 20 the finder optical system is provided separately from the photographic optical system. The finder optical system is accommodated in a finder block (supporting member) 96 positioned in an upper space in the casing 19 (see FIGS. 2 through 7). A part of the finder block 96, i.e., an optical path bending portion 96p shown in FIG. 3 or 6, is positioned in the aforementioned space IS.

The camera 20 is provided in an upper space in the casing 19 with a unit block 90 by which the aforementioned finder block 96, a photometric optical system 70, a distance measuring unit 80, etc. are supported. The unit block 90 is provided with a base 91 and a cover 100 fixed on the base 91. The finder block 96, the distance measuring unit 80, etc. are held between the base 91 and the cover 100. The unit block 90 is secured to the stationary block 20a by two set screws (not shown) via holes 93, 108 respectively formed on the base 91 and the cover 100.

The base 91 is provided on one side thereof (on the left side as viewed in FIG. 5 or 7) with a holding block 92. The holding block 92 holds and supports the photometric optical system 70 at a frontmost part of the holding block 92. The photometric optical system 70 consists of first and second photometric lenses 70a, 70b disposed horizontally side by side. In the holding block 92 a first photometering element 150 and a second photometering element 151 are provided so as to be located behind the first photometric lens 70a and the second photometric lens 70b, respectively. A whole image area seen through the zoom finder is photometered with the first photometric lens 70a and the first photometering element 150 while only a center portion of the whole image area is photometered with the second photometric lens 70b and the second photometering element 151, so as to determine whether the current photographic condition is a backlit condition (shooting against the light) or not. The holding block 92 is provided at a front part thereof with a self-timer-ON indicating light emitter 71 in the vicinity of the second photometric lens 70b. The first photometric lens 70a, the second photometric lens 70b and the self-timer-ON indicating light emitter 71 are positioned immediately behind the photometric window 27b, the photometric window 27a and the self-timer-ON indicating window 26, respectively.

Figure 14:
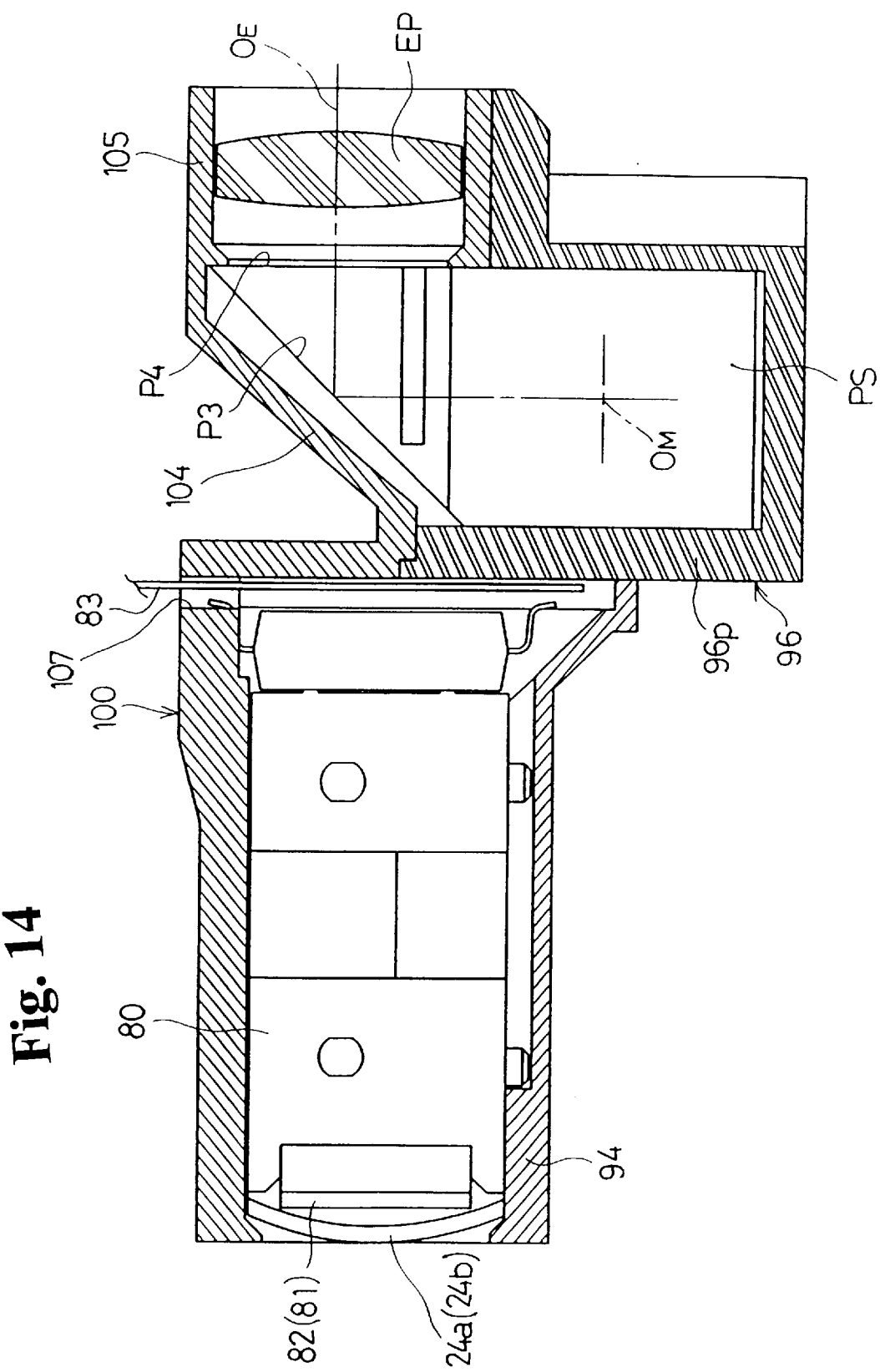
FIG. 14 is a cross sectional view of the unit block along XIV—XIV line shown in FIG. 5.

The base 91 is provided on the other side thereof (on the right side as viewed in FIG. 5 or 7) with a supporting base 94 on which the distance measuring unit 80 is supported. The distance measuring unit 80 is held between the supporting base 94 and a covering part 101 integrally formed on the cover 100. The distance measuring unit 80 is a conventional distance measuring unit generally used for a passive type of AF (autofocus) system. The distance measuring unit 80 is provided at the front thereof with a pair of light receiving portions 81, 82. The light receiving portions 81, 82 are positioned immediately behind the distance measuring windows 24b, 24a, respectively. An end of a strip-shaped flexible printed wire 83 (see FIGS. 7 and 14) is connected to the distance measuring unit 80. The connected end of the flexible printed wire 83 is located approximately at a rear end of the distance measuring unit 80 on one side thereof (the right side as viewed in FIG. 7). The flexible printed wire 83 extends vertically as shown in FIG. 14 to be lead to the outside of the unit block 90 through a vertical hole 107 formed on the cover 100.

The finder optical system supported by the finder block 96 is a real image type of finder optical system and is constructed such that the magnification thereof varies in sequence with zooming of the zoom lens, i.e., the variation of the focal length of the photographic optical system. The finder optical system includes a first objective lens element L1, a second objective lens element L2, a third objective lens element L3, a first reflector (mirror) M1, a second reflector (mirror) M2, a condenser lens (first transparent member) CL, a liquid crystal display (LCD) DP, a transparent plate (second transparent member) TP, a prism PS, an eyepiece lens EP, etc., in this order from the forefront to the rearmost of the finder optical system. The prism PS includes a first reflective surface P2 and a second reflective surface P3. The first, second and third objective lens elements L1, L2 and L3 together form an objective optical system of the finder optical system, and the eyepiece lens EP forms an eyepiece optical system of the finder optical system. The first reflector M1, the second reflector M2 and the prism PS form an erecting optical system in the finder optical system.

The first objective lens element L1 is a fixed lens, while the second and third objective lens elements L2, L3 are each movable along an objective optical axis $O_S$ extending substantially parallel to an optical axis O (see FIGS. 2 and 3) of the photographic optical system. Both the photographic optical axis O and the objective optical axis $O_S$ extend in a forward/rearward direction of the camera (vertical direction as viewed in FIG. 2). The magnification of the finder optical system varies by the movement of each of the second and third objective lens elements L2, L3 relative to the first objective lens element L1. Accordingly, the first, second and third objective lens elements L1, L2 and L3 together form a magnification-varying optical system in the finder optical system. Each of the first, second and third objective lens elements L1, L2 and L3 is formed in a rectangular shape having a horizontal length wider than a vertical length as seen from the front of the camera 20, i.e., as viewed in FIG.

6. In addition, the objective lens element L1 is formed to have an effective diameter wider than that of either the second or third lens element L2 or L3.

Figure 13:
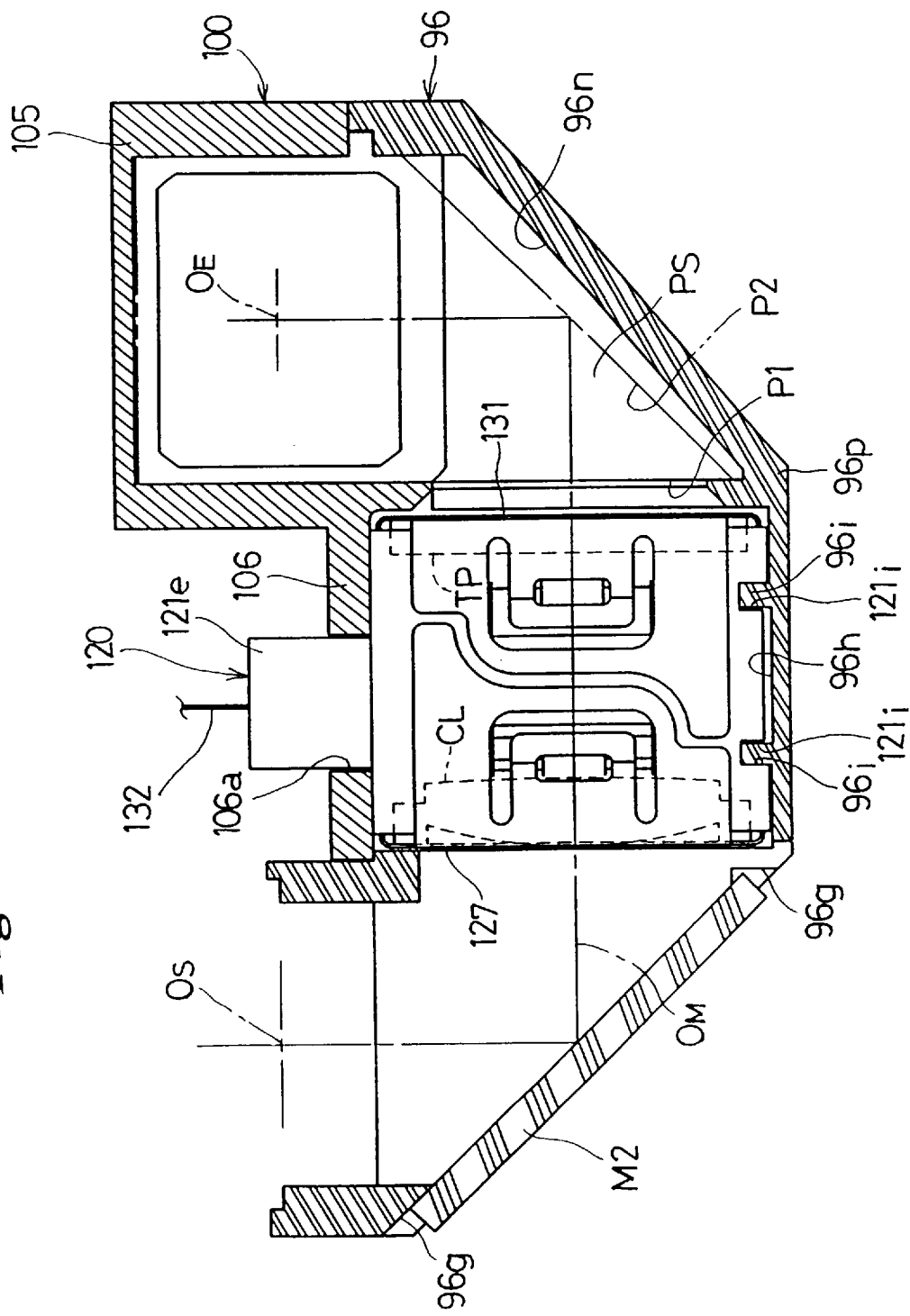
FIG. 13 is a cross sectional view of the unit block along XIII—XIII line shown in FIG. 5.

A middle part of the finder optical system from the first reflector M1 to the second reflective surface P3 connects the objective optical system with the eyepiece optical system of the finder optical system (FIG. 14). A part of the middle part from the second reflector M2 to the first reflective surface P2 of the prism PS is supported by the aforementioned optical path bending portion 96p formed on the finder block 96 (FIG. 13). The optical path bending portion 96p is formed to extend downwardly toward the photographic aperture 35 so as to bend the optical path downwards, so that the optical path bending portion 96p is positioned in the aforementioned space IS (FIG. 3). The stationary block 20a is provided at an upper edge of the aperture frame 35 with a cutout 47 formed along an outline of the optical path bending portion 96p.

Figure 11:
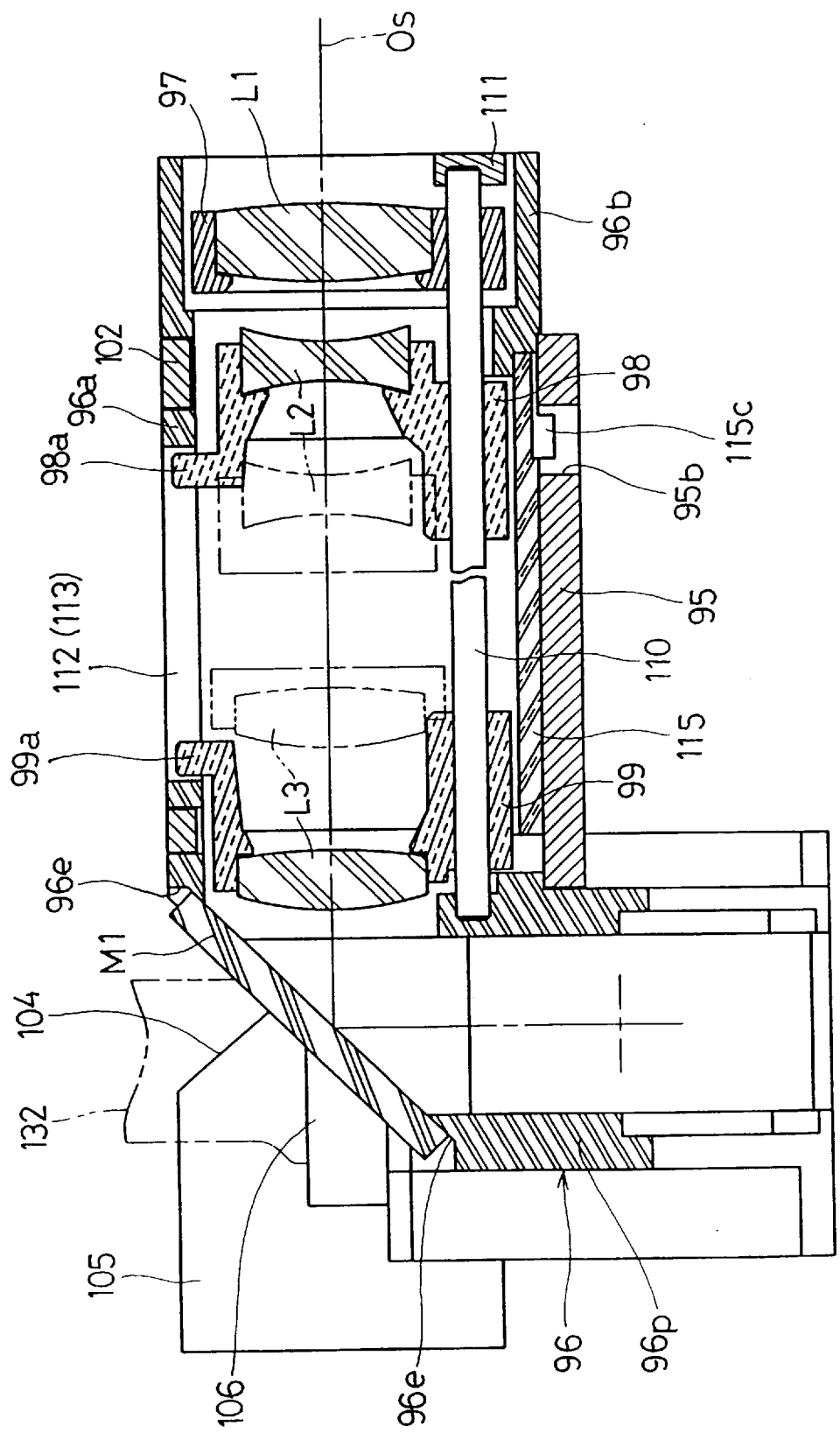
FIG. 11 is a cross sectional view of the unit block along XI—XI line shown in FIG. 6.

The base 91 (FIG. 7) is provided between the holding block 92 and the supporting base 94 with an objective optical system supporting portion 95 which extends horizontally from the front to the rear of the camera 20. The inner periphery of the objective optical system supporting portion 95 is formed as a cam plate supporting surface 95a in the shape of an inner peripheral surface of a cylinder. The finder block 96 is provided with an objective optical system supporting barrel 96a (FIG. 5) having a substantially cylindrical cross-section and extending in the objective optical system supporting portion 95 along the objective optical axis $O_S$. A rectangular frame 96b (FIG. 7) is integrally formed at the front end of the objective optical system supporting barrel 96a between the holding block 92 and the supporting base 94. A first lens frame 97 which supports the first objective lens element L1, is accommodated in the rectangular frame 96b (FIG. 11).

The unit block 90 is provided with a pair of guide shafts 110 (FIG. 6) extending parallel to each other along the objective optical axis $O_S$ in the objective optical system supporting barrel 96a and the rectangular frame 96b. As shown in FIG. 11, the rear end of each guide shaft 110 is secured to the finder block 96, and the front end of each guide shaft 110 is secured to a supporting member 111 fixed to the rectangular frame 96b. The first lens frame 97 is fixed on the pair of guide shafts 110, so that the first objective lens element L1 is immovable relative to the guide shafts 110.

The second objective lens element L2 and the third objective lens element L3 are supported by a second lens frame 98 and a third lens frame 99, respectively. The second and third lens frames 98, 99 are slidably fitted on the pair of guide shafts 110 to be guided there along in a direction of the objective optical axis $O_S$. An engaging pin 98a is formed on the top of the second lens frame 98. Likewise, an engaging pin 99a is formed on the top of the third lens frame 99. The engaging pins 98a, 99a are respectively fitted in guiding slots 112, 113 formed at the top of the objective optical system supporting barrel 96a and extending parallel to each other in the direction of the objective optical axis $O_S$ (see FIGS. 5, 15 and 16). Accordingly, the second and third lens frames 98, 99 are guided along the objective optical axis $O_S$ by means of the guide shafts 110 and the guide slots 112, 113.

Figure 5:
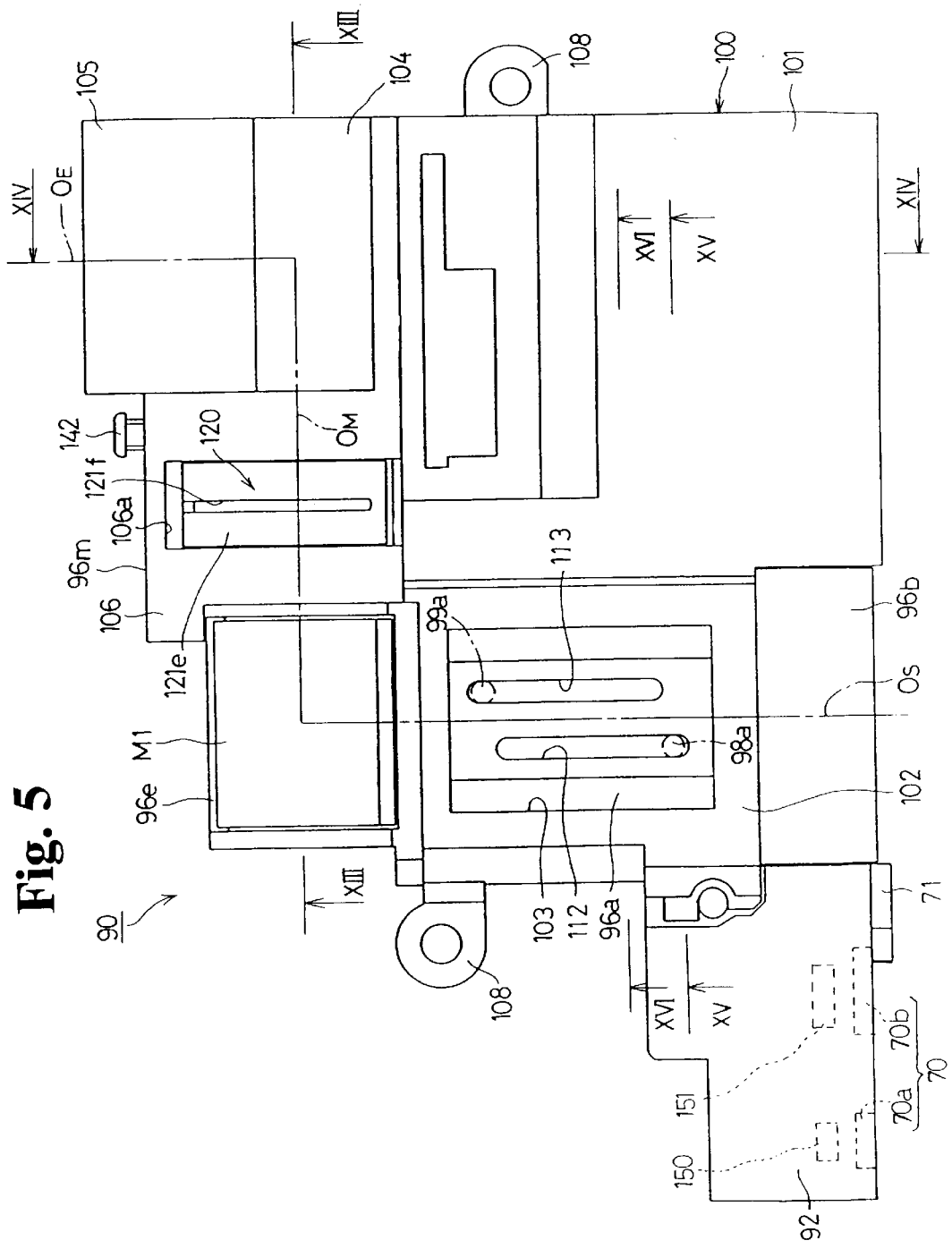
FIG. 5 is a plan view of a unit block provided in the lens shutter type of camera shown in FIG. 1.
Figure 6:
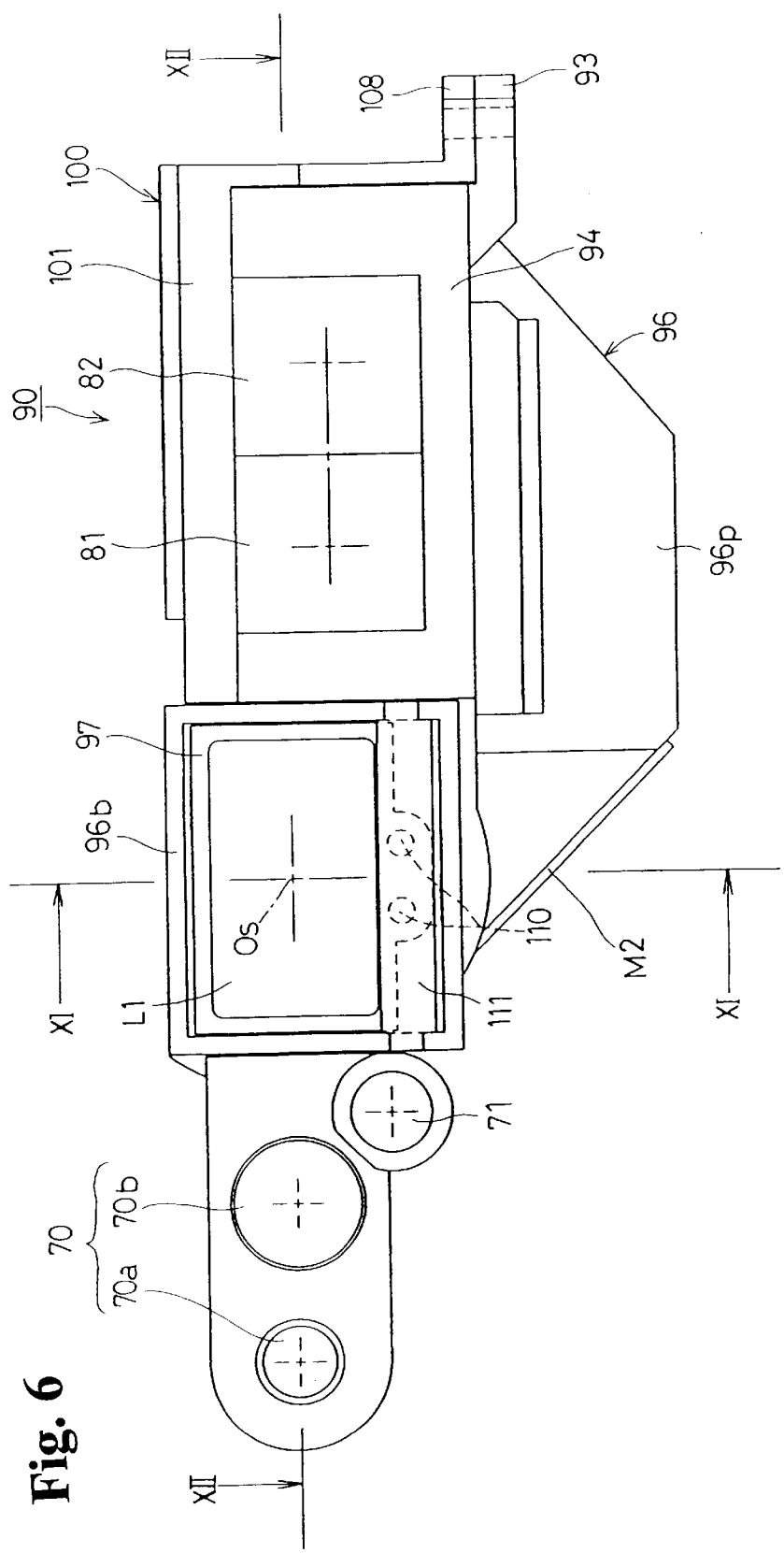
FIG. 6 is a front view of the unit block shown in FIG. 5.
Figure 7:
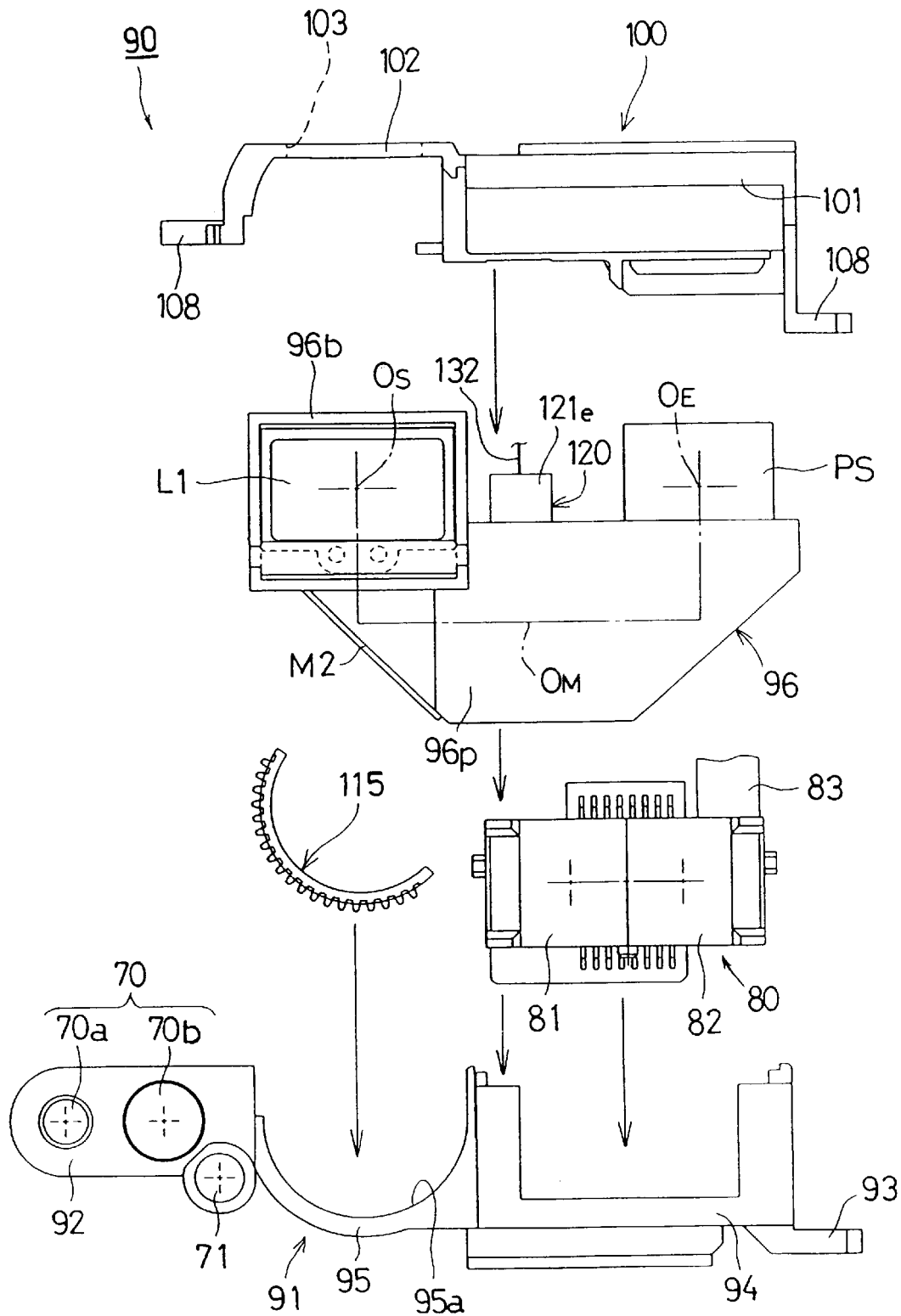
FIG. 7 is an exploded view of the unit block shown in FIG. 5 or 6.
Figure 8:
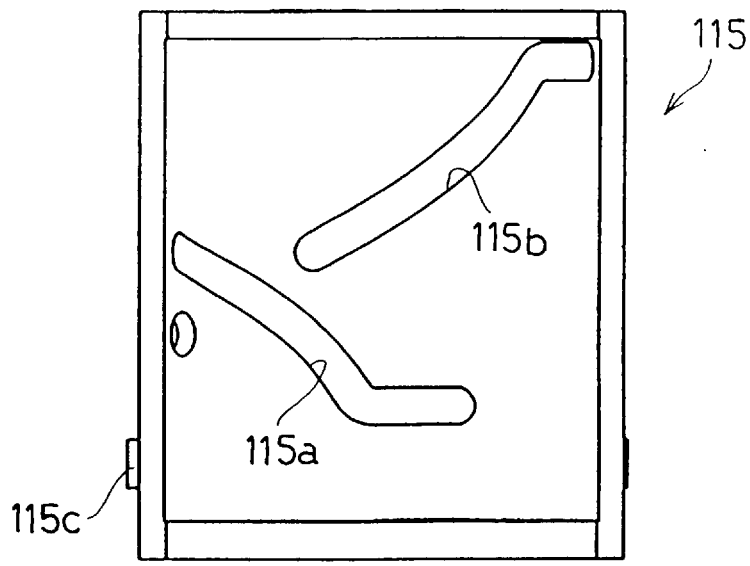
FIG. 8 is a plan view of a cam plate provided in the unit block, showing the inner periphery thereof.
Figure 9:
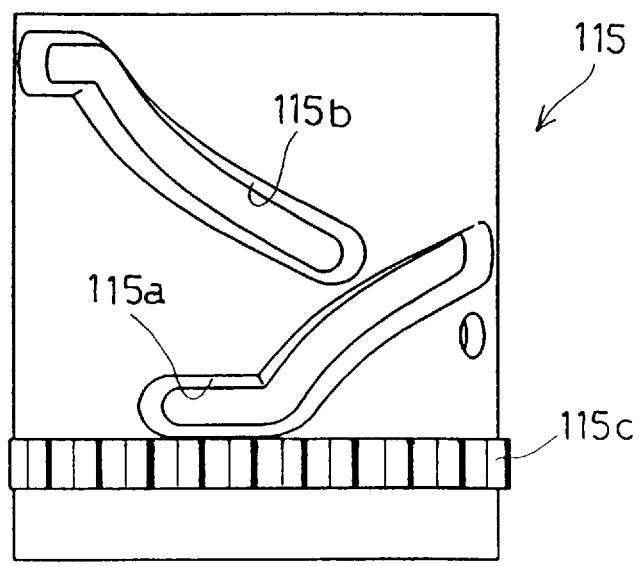
FIG. 9 is a plan view of the cam plate shown in FIG. 8, showing the outer periphery thereof.
Figure 10:
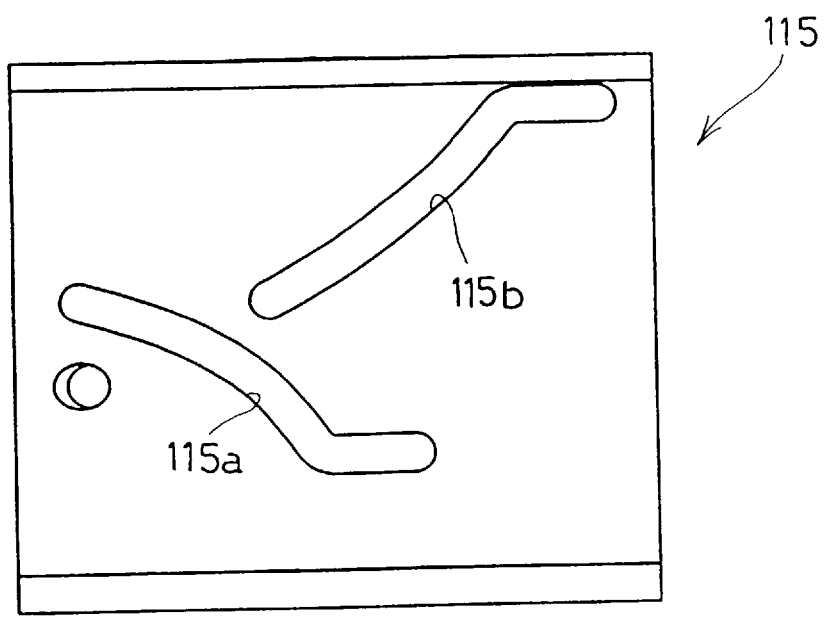
FIG. 10 is a developed view of the inner periphery of the cam plate shown in FIG. 8.
Figure 15:
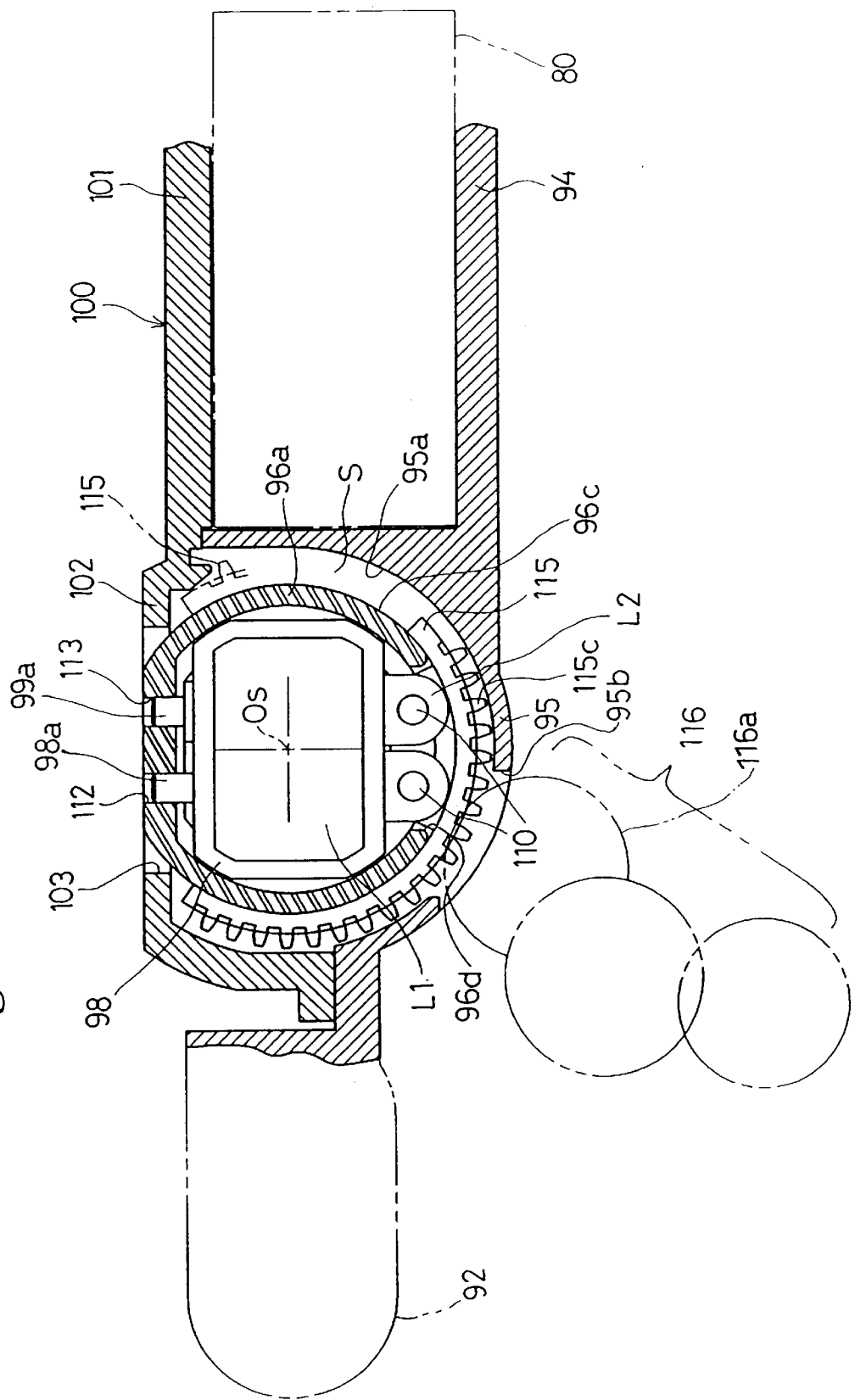
FIG. 15 is a cross sectional view of the unit block along XV—XV line shown in FIG. 5.
Figure 16:
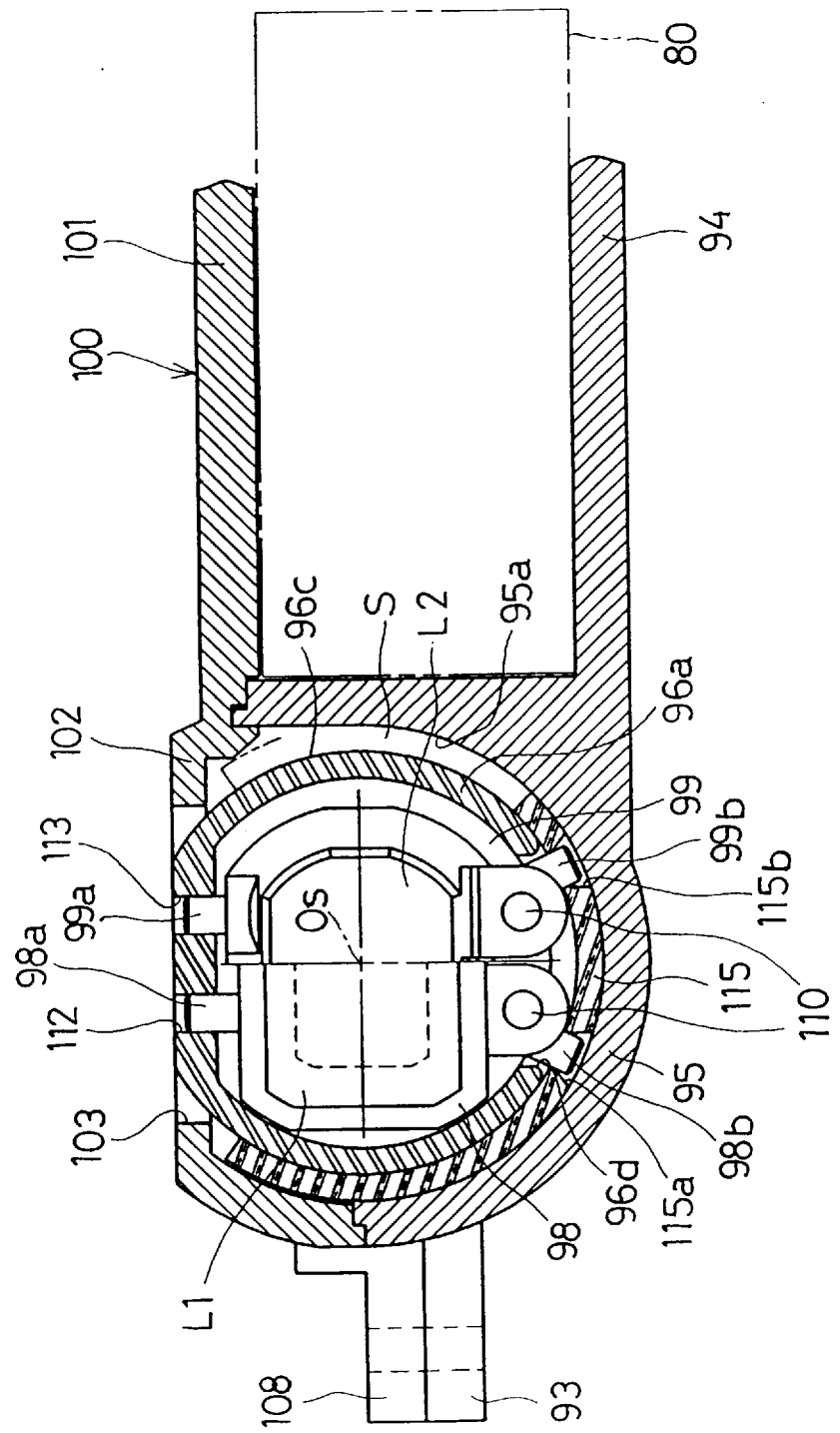
FIG. 16 is a cross sectional view of the unit block along XVI—XVI line shown in FIG. 5.

The cover 100 is provided with a plate 102 having a rectangular opening 103 (see FIGS. 5, 15 and 16). The upper end of the objective optical system supporting barrel 96a is located in the rectangular opening 103, as shown in FIG. 15 or 16.

As shown in FIG. 16, the second lens frame 98 is provided at the bottom thereof with a cam pin 98b extending downwards. Likewise, the third lens frame 99 is provided at the bottom thereof with a cam pin 99b extending downwards. The cam pins 99a, 99b are respectively fitted in cam slots 115a, 115b, which are formed on a curved cam plate 115, through a hole 96d formed at the bottom of the objective optical system supporting barrel 96a. The curved cam plate 115 is formed as a half-cut cylinder having an arc-shaped cross-section as shown in FIG. 16. Details regarding the structure of the curved cam plate 115 will be hereinafter discussed.

The outer periphery of the objective optical system supporting barrel 96a is formed as a cam plate guiding surface 96c which substantially extends parallel and coaxial to the cam plate supporting surface 95a. Namely, the cam plate guiding surface 96c and the cam plate supporting surface 95a extend along the objective optical axis $O_S$ while maintaining a predetermined distance therebetween, so that a space S extending in the direction of the objective optical axis $O_S$ is formed between the cam plate guiding surface 96c and the cam plate supporting surface 95a. The curved cam plate 115 is disposed in the space S so as to be slidable and rotatable in the space S in a circumferential direction thereof approximately about the objective optical axis $O_S$.

The curved cam plate 115 is provided with the aforementioned two cam slots 115a, 115b, each having a predetermined contour. The cam pins 98b, 99b are respectively fitted in the cam slots 115a, 115b. The curved cam plate 115 is provided with a circumferential gear 115c formed on an outer periphery of the curved cam plate 115 in the vicinity of the front end thereof. The objective optical system supporting portion 95 is provided, at a lower portion thereof facing a part of the circumferential gear 115c, with an opening 95b (FIG. 15). The circumferential gear 115c remains in mesh with a gear 116a through the opening 95b. The gear 116a is one of a plurality of gears in a gear train 116 which connects the circumferential gear 115c with a photographic zoom lens driving mechanism (not shown).

Accordingly, the rotation of a zoom motor (not shown) is transmitted not only to the photographic zoom lens driving mechanism to move at least one lens group in the zoom lens to effect zooming, but also to the circumferential gear 115c through the gear train 116 at the same time. Due to this structure, when the zoom operational button 32a or 32b is depressed, the zoom motor is actuated to drive the photographic zoom lens driving mechanism to effect zooming. At the same time, the rotation of the zoom motor is transmitted to the curved cam plate 115 via the gear train 116 and the circumferential gear 115c, so that the curved cam plate 115 rotates in the space S approximately about the objective optical axis $O_S$. This rotation of the curved cam plate 115 causes the second and third lens frames 98, 99 to each move relative to the first lens frame 97 while changing the distance between the second and third lens frames 98, 99, through the cam slots 115a, 115b and the cam pins 98b, 99b. Thus, the focal length of the finder optical system is continuously varied. Accordingly, the contour of each cam slot 115a, 115b is predetermined such that the focal length of the photographic optical system and the focal length of the finder optical system are correspondingly varied. In FIG. 11 the second and third objective lens elements L2, L3 shown by solid lines indicate that the second and third objective lens elements L2, L3 are located at respective wide-angle extremities, while the second and third objective lens elements L2, L3 shown by phantom lines indicate that the second and third objective lens elements L2, L3 are located at respective telephoto extremities.

The first reflector M1 is positioned behind the third objective lens element L3 as shown in FIG. 11. The first reflector M1 reflects light, emitted from the third objective lens element L3 toward the first reflector M1, downwardly at a right angle (90°). The peripheral edge of the first reflector M1 is adhered by an adhesive (not shown) to a first mirror supporting seat 96e (see FIG. 11) formed on the finder block 96.

The second reflector M2 (FIG. 13) is positioned below the first reflector M1. The second reflector M2 reflects light, emitted from the first reflector M1 at a right angle (90°) to the second reflector M2, rightwardly as viewed in FIGS. 5 and 6. The peripheral edge of the second reflector M2 is adhered by an adhesive (not shown) to a second mirror supporting seat 96g (see FIG. 13) formed on the finder block 96. The light reflected by the second mirror M2 is incident upon an adjusting block (hollow member) 120 positioned in the optical path bending portion 96p.

Figure 18:
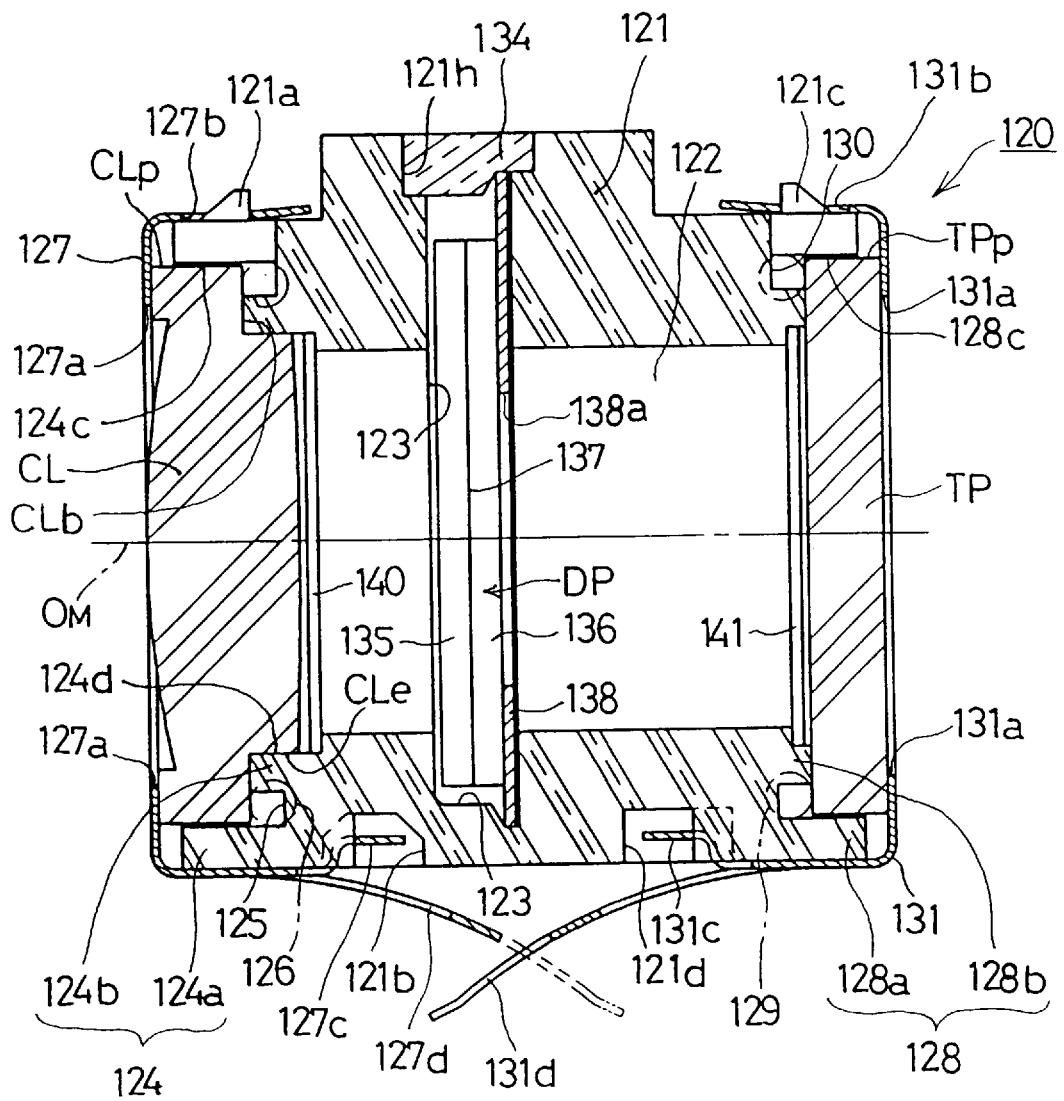
FIG. 18 is a cross sectional view of the adjusting block shown in FIG. 17.
Figure 19:
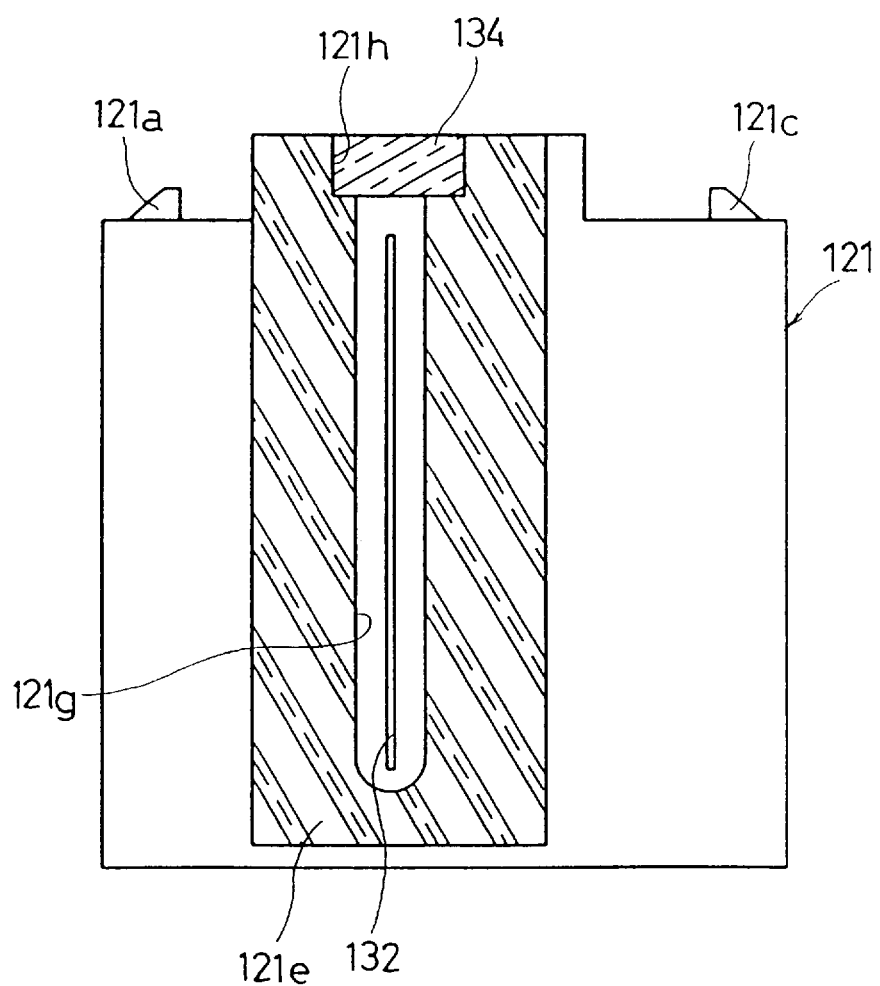
FIG. 19 is a cross sectional view of an extended portion formed on the adjusting block.

The adjusting block 120, assembled in advance separately from the finder block 96, is accommodated in a substantially cube shaped space 96h formed in the optical path bending portion 96p. The adjusting block 120 is formed to have a substantially cube shape except for an extended portion 121e formed at the top of the adjusting block 120. The adjusting block 120 is provided with a frame 121 having a light path 122 which allows light coming from the second reflector M2 to pass through the light path 122 to be incident upon the prism PS. The condenser lens CL is secured to the frame 121 at one end of the light path adjacent to the second reflector M2, while the transparent plate TP is secured to the frame 121 at the other end of the light path 122 (FIG. 18). The liquid crystal display DP is secured to the frame 121 positioned between the condenser lens CL and the transparent plate TP.

Figure 20:
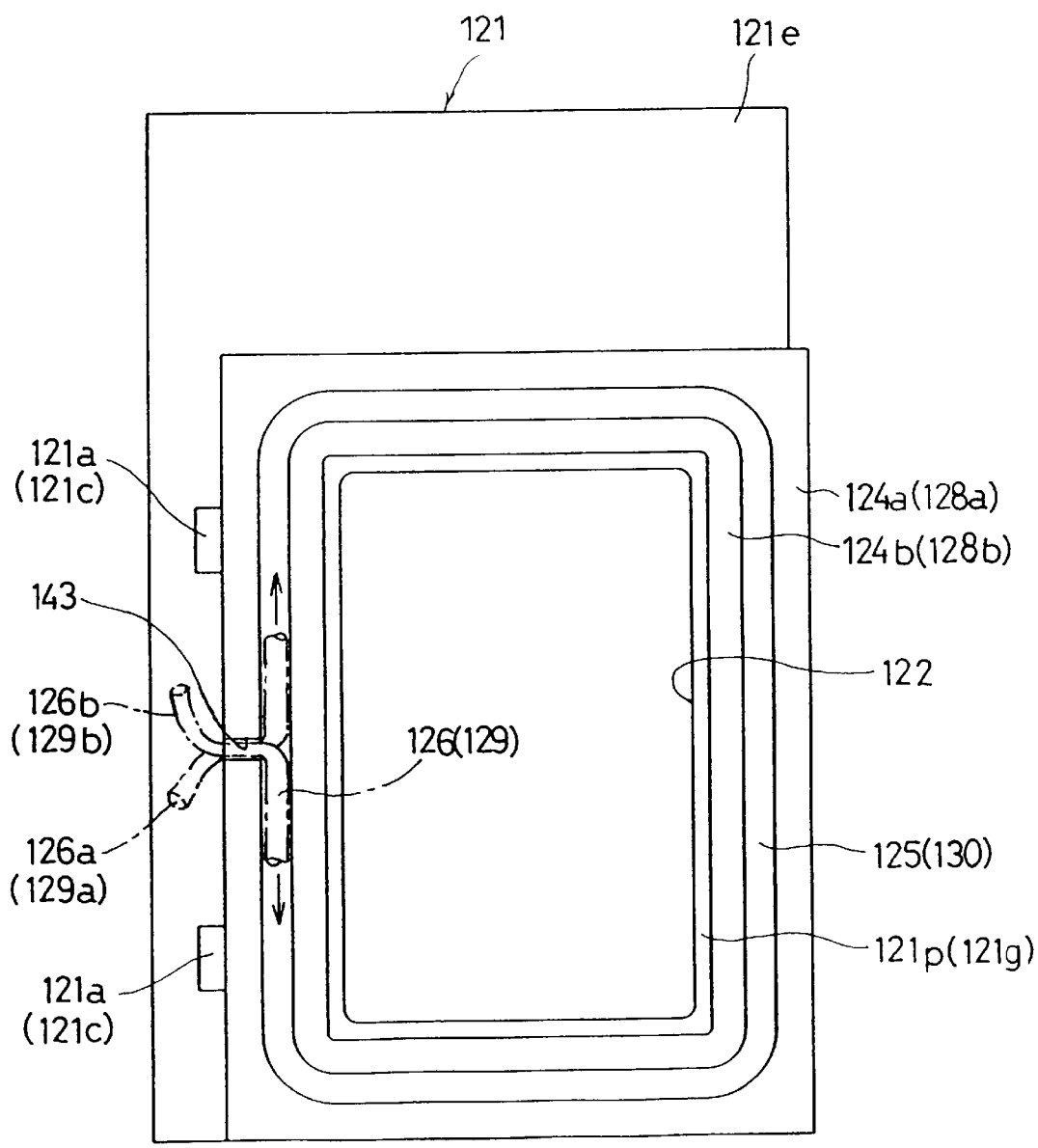
FIG. 20 is a side view of a frame of the adjusting unit.

A lens holding portion 124 for holding the condenser lens CL to the frame 121 is formed entirely along an end of the frame 121 facing toward the second reflector M2. The lens holding portion 124 consists of an outer loop extension 124a and an inner loop extension 124b. The inner loop extension 124b is located closer to the light path 122 than the outer loop extension 124a and is formed shorter than the outer loop extension 124a, i.e., recessed in the direction of the transparent plate TP. As shown in FIG. 20 a loop groove 125 in which a sealing member (first sealing member) 126 is positioned, is formed on the frame between the outer loop extension 124a and the inner loop extension 124b. The sealing member 126 is made of an air-permeable porous material such as a polytetrafluoroethylene.

The condenser lens CL is provided with an outer edge surface CLp which faces an inner loop surface 124c of the outer loop extension 124a, an inner edge surface CLe which faces an inner loop surface 124d of the inner loop extension 124b, and a connecting loop surface CLb which extends perpendicular to both the inner and outer edge surfaces CLe, CLp, and connects the inner edge surface CLe with the outer edge surface CLp. The circumferential length of the inner loop surface 124c is formed slightly larger than that of the outer edge surface CLp, and the circumferential length of the inner loop surface 124d is formed slightly larger than that of the inner edge surface CLe. Due to this structure, in the case where the condenser lens CL is properly fixed to the lens holding portion 124, a slight gap is formed between the outer edge surface CLp and the inner loop surface 124c and between the inner edge surface CLe and the inner loop surface 124d. Each slight gap is formed to be a minimum gap allowing air to barely enter or exit the adjusting block 120.

The condenser lens CL is secured to the lens holding portion 124 with a retaining frame 127 which engages with the frame 121. In this state, the outer edge surface CLp faces the inner loop surface 124c and the sealing member 126 is positioned in the loop groove 125 with the sealing member 126 slightly compressed therein. The retaining frame 127 is made of an elastic material such as a metal spring plate or the like. The retaining frame 127 is provided at a center part thereof with a rectangular opening 127a in order to not cover an effective surface of the condenser lens CL. The retaining frame 127 is provided at one end thereof with two engaging holes 127b which respectively engage with two engaging claws 121a formed on the frame 121. The retaining frame 127 is further provided at the opposite end thereof with an inwardly-bent portion 127c which engages with recessed hole 121b formed on the frame 121. Accordingly, the condenser lens CL is secured to the lens holding portion 124 by using the retaining frame 127 with the engaging claws 121a engaging with the engaging holes 127b and with the inwardly-bent portion 127c engaging with the recessed hole 121b. The retaining frame 127 is further provided at the aforementioned opposite end thereof with a leaf spring (biasing member) 127d which curves toward the front of the camera 20.

In the case where the condenser lens CL is properly secured to the lens holding portion 124 with the retaining frame 127, the sealing member 126 is compressed between the connecting loop surface CLb and the loop groove 125, so that the retaining frame 127 presses the condenser lens CL in the direction of the transparent plate TP against a biasing force of the sealing member 126. In this state, the connecting loop surface CLb does not contact the inner loop extension 124b and a slight gap exists therebetween. This slight gap connects the aforementioned two slight gaps, i.e., the gaps between the outer edge surface CLp and the inner loop surface 124c and between the inner edge surface CLe and the inner loop surface 124d. Therefore, through these three slight gaps formed between the condenser lens CL and the frame 121, air can enter and exit the adjusting block 120 even with the sealing member 126, since the sealing member 126 is made of an air-permeable porous material as noted above.

Figure 17:
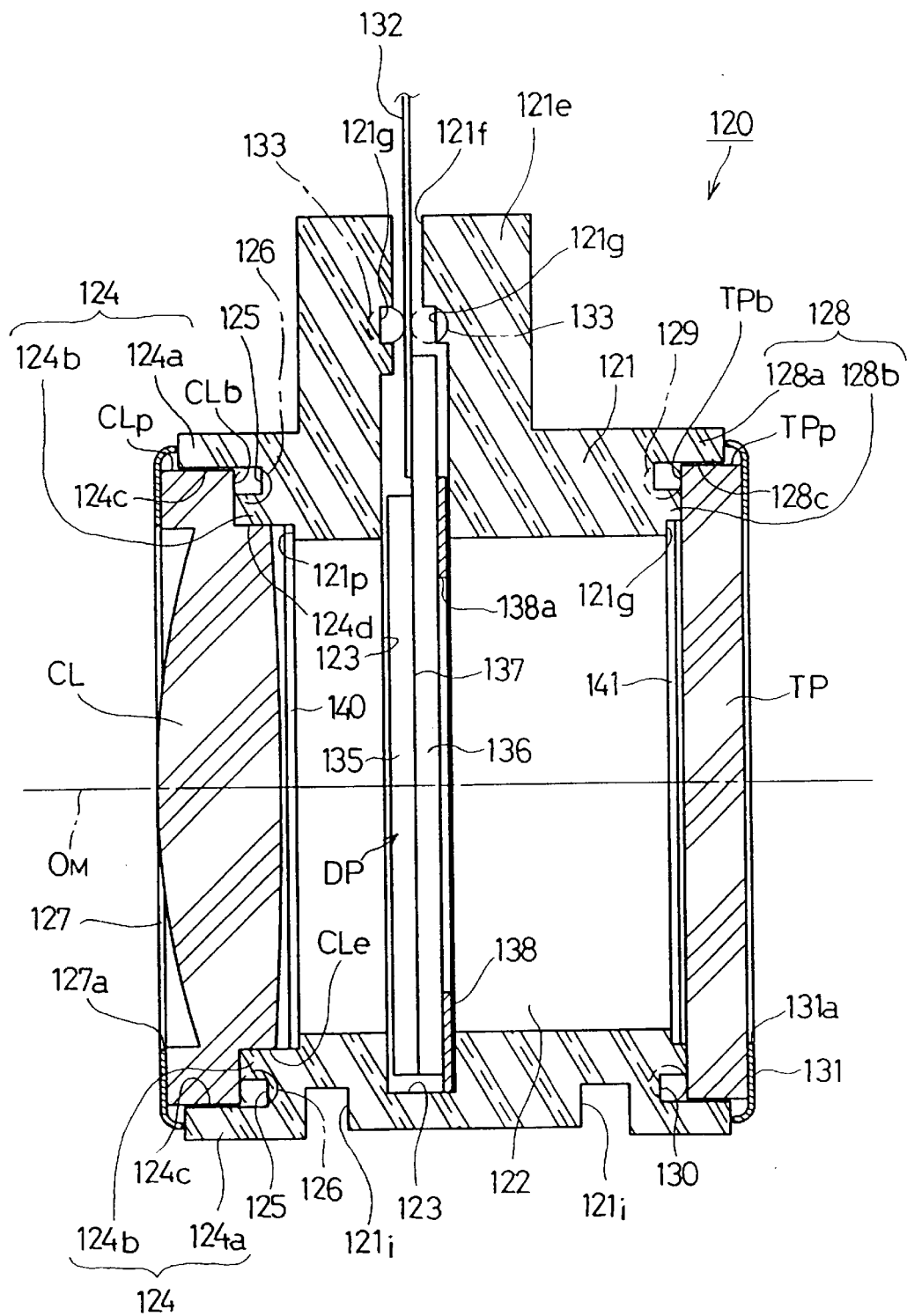
FIG. 17 is a cross sectional view of an adjusting block provided in the unit block.

On the other hand, a lens holding portion 128 for holding the transparent plate TP to the frame 121 is formed entirely along another end of the frame 121 facing toward the prism PS. The lens holding portion 128 is formed in a similar manner to the lens holding portion 124. The lens holding portion 128 consists of an outer loop extension 128a and an inner loop extension 128b. The inner loop extension 128b is located closer to the light path 122 than the outer loop extension 128a and is formed shorter than the outer loop extension 128a, i.e., recessed in the direction of the condenser lens CL. The transparent plate TP is secured to the lens holding portion 128 in a similar manner in which the condenser lens CL is secured to the lens holding portion 124. Therefore, the transparent plate TP is secured to the lens holding portion 128 with a retaining frame 131, similar to the retaining frame 127, which engages with the frame 121. In this state, an outer edge surface TPp of the transparent plate TP faces an inner loop surface 128c of the outer loop extension 128a, and a sealing member 129, similar to the sealing member 126, is positioned in a loop groove 130 formed between the outer loop extension 128a and the inner loop extension 128b with the sealing member 129 slightly compressed therein. The retaining frame 131 is provided at a center part thereof with a rectangular opening 131a in order to not cover an effective surface of the transparent plate TP. The retaining frame 131 is provided at one end thereof with two engaging holes 131b which respectively engage with two engaging claws 121c formed on the frame 121. The retaining frame 131 is further provided at the opposite end thereof with an inwardly-bent portion 131c which engages with a recessed hole 121d formed on the frame 121. Accordingly, the transparent plate TP is secured to the lens holding portion 128 by using the retaining frame 131 with the engaging claws 121c engaging with the engaging holes 131b and with the inwardly-bent portion 131c engaging with the recessed hole 121d. The retaining frame 131 is further provided at the aforementioned opposite end thereof with a leaf spring (biasing member) 131d which curves toward the front of the camera 20. In the case where the transparent plate TP is properly secured to the lens holding portion 128 with the retaining frame 131, through a slight gap formed between the transparent plate TP and the frame 121 similar to the aforementioned condenser lens holding structure, air can enter and exit the adjusting block 120 even with the sealing member 129, since the sealing member 129 is made of an air-permeable porous material. In FIG. 17 or 18, the sealing members 126, 129 shown by phantom lines indicate the normal shape thereof before being compressed.

As shown in FIG. 20, each of the sealing members 126, 129 is formed string-like. FIG. 20 shows a state where the sealing member 126 or 129 of such a shape is positioned in the corresponding loop groove 125 or 130. Although FIG. 20 shows only one side of the frame 121 seen from the left hand side as viewed in FIG. 17, that is, FIG. 20 shows only that side of the frame 121 on which the sealing member 126 is provided, FIG. 20 is also herein used to show a state where the sealing member 129 is positioned in the loop groove 130 since the sealing member 129 is provided on the opposite side of the frame 121 in a similar manner to that of the sealing member 126. Note that a mirror image of FIG. 20 substantially shows the opposite side of the frame 121 seen from the right hand side as viewed in FIG. 17, that is, that side of the frame 121 on which the sealing member 129 is provided.

As shown in FIG. 20, a groove 143 is formed on a part of the outer loop extension 124a (or 128a). The sealing member 126 (or 129) is positioned in the loop groove 125 (130) with both ends of the sealing member 126 (or 129) being positioned outside the outer loop extension 124a (or 128a) through the groove 143. Namely, when the sealing member 126 (or 129) is fitted in the loop groove 125 (130) during assembly of the adjusting block 120, firstly, an approximate end of the sealing member 126 (or 129) is fitted in the groove 143 with the extreme end 126a (129a) of the approximate end being positioned outside the outer loop extension 124a. Subsequently, the middle part between the ends of the sealing member 126 (or 129) is properly fitted in the loop groove 125 (130). Thereafter, the other approximate end of the sealing member 126 (or 129) is fitted in the groove 143 to be placed on the aforementioned approximate end of the sealing member 126 (or 129) with the extreme end 126b (129b) being positioned outside the outer loop extension 124a.

The liquid crystal display DP is positioned parallel to either the condenser lens CL or the transparent plate TP and thus perpendicular to an optical axis $O_M$ of light emitted from the second reflector M2 and passing through the condenser lens CL. An annular groove 123 is formed on an inner surface of frame 121 to surround the light path 122. The liquid crystal display DP is fixed to the frame 121 such that the circumferential edge of the liquid crystal display DP is positioned in the annular groove 123. A slot 121f for connecting the annular groove 123 to the outside of the frame 121 is formed in the aforementioned extended portion 121e formed at the top of the frame 121. One end of a strip-shaped flexible printed wire 132 is connected with the liquid crystal display DP and extends upward to the outside of the frame 121 through the slot 121f, as shown in FIG. 17. An annular groove 121g is formed in the extended portion 121e on an inner surface of the slot 121f so as to surround the flexible printed wire 132. A sealing member 133 is positioned in the annular groove 121g to be compressed therein. The sealing member 133 is made of an air-permeable porous material such as a polytetrafluoroethylene, similar to the sealing member 126 or 129. A part of the flexible printed wire 132 positioned in the extended portion 121e and surrounded by the annular groove 121g is sandwiched to be pressed by the sealing member 133. With this structure, i.e., the slot 121f being sealed by the sealing member 133, air can enter and exit the adjusting block 120 through the sealing member 133 since the sealing member 133 is made of an air-permeable porous material as noted above. During assembly of the liquid crystal display DP, the liquid crystal display is inserted in the frame 121 through an opening 121h formed on the frame 121 so as to be connected with the annular groove 123. After the liquid crystal display DP is inserted in the frame 121 through the opening 121h, a stopper 134 for closing the opening is adhered to the opening 121h by an adhesive (not shown). In FIG. 17, the sealing member 133 shown by phantom lines indicates the normal shape thereof before being compressed.

The liquid crystal display DP is provided with two transparent glass plates 135, 136 which are parallel to each other. Liquid crystal (not shown) is enclosed between the two transparent glass plates 135, 136. When viewed through the finder, the enclosed liquid crystal is transparent when no voltage is applied thereto. When an image seen through the finder does not adequately coincide with, i.e., deviates substantially from an image to be actually photographed, namely, when a parallax exists, especially upon taking a picture in a macro mode or a panorama mode, voltage is applied to a part of the enclosed liquid crystal which corresponds to a non-photographed part in the finder image, so that the part of the enclosed liquid crystal becomes translucent. Due to the part of the enclosed liquid crystal becoming translucent, a photographer can perceive that the translucent part of an image seen through the finder lies out of an image to be photographed.

Light reflected by the second reflector M2 and passed through the condenser lens CL is incident upon the liquid crystal display DP. The condenser lens CL converges light passing therethrough to form a subject image at or near a contacting surface 137 between the two transparent glass plates 135, 136. In other words, the liquid crystal display DP is positioned at or near a focal plane (a focal plane of the objective optical system) in the finder optical system. A rectangular finder frame 138 is fixed on the transparent glass plate 136 on one side thereof facing toward the transparent plate TP. A central portion of the finder frame 138 is provided with a rectangular opening 138a which corresponds to the rectangular-shaped photographic aperture 35.

The adjusting block 120 is provided in the frame 121 with rectangular polarizing plates 140, 141 positioned adjacent to the condenser lens CL and the transparent plate TP, respectively. The polarizing plate 140 is positioned adjacent to the condenser lens CL between the condenser lens CL and the liquid crystal display DP, while the polarizing plate 141 is positioned adjacent to the transparent plate TP between the transparent plate TP and the liquid crystal display DP. A circumferential edge of the polarizing plate 140 is secured to a supporting seat 121p secured to the frame 121 by adhesive or the like. With the polarizing plates 140, 141, the part of the liquid crystal display DP in which liquid crystal is enclosed cannot be seen in a finder view seen through the finder before that part of the liquid crystal display DP is activated to become translucent by a voltage being applied thereto.

Figure 12:
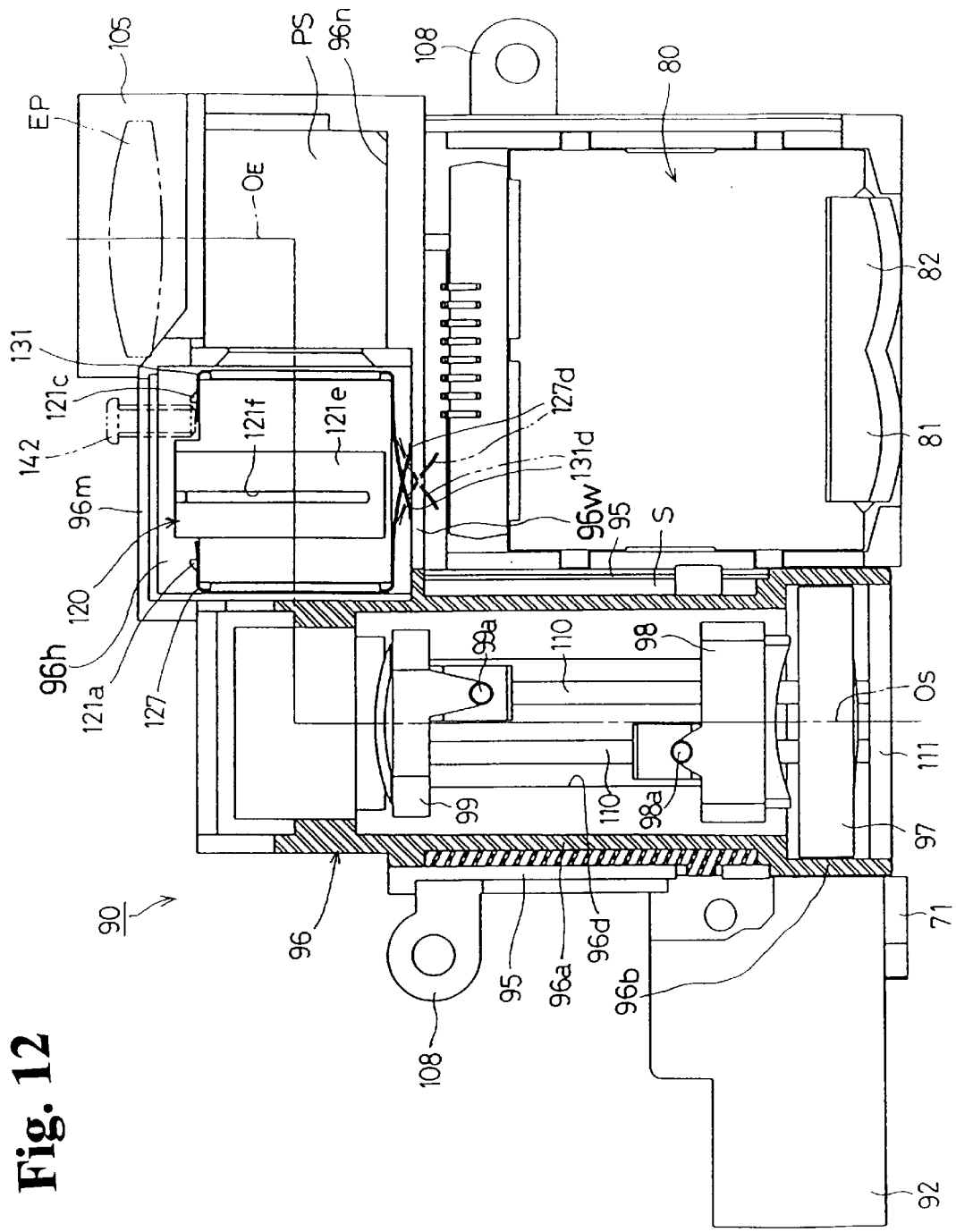
FIG. 12 is a cross sectional view of the unit block along XII—XII line shown in FIG. 6.

At the bottom of the frame 121 a pair of parallel guiding grooves 121i each perpendicular to the optical axis $O_M$ are formed. The guiding grooves 121i slidably engage with a corresponding pair of guiding rails 96i formed on the bottom of the aforementioned cube shaped space 96h (FIG. 13). A retaining wall 106 is integrally formed on the cover 100 as an upper wall of the cube shaped space 96h. A rectangular opening 106a which extends lengthwise in the direction of the photographic optical axis O is formed on the retaining wall 106. The extended portion 121e extends out of the cube shaped space 96h to the outside thereof through the rectangular opening 106a. The rectangular opening 106a is formed longer than the extended portion 121e in the direction of the objective optical axis $O_S$ so as to allow the extended portion 121e to move along the rectangular opening 106a only in the direction of the objective optical axis $O_S$. Namely, the extended portion 121e is guided by the rectangular opening 106a along the rectangular opening 106a in the direction of the objective optical axis $O_S$, i.e., in the direction perpendicular to the optical axis $O_M$. The cube shaped space 96h is longer than the adjusting block 120 by a predetermined length in the direction of the objective optical axis $O_S$ so that the adjusting block 120 can move in the cube shaped space 96h in the direction of the objective optical axis $O_S$. Each tip of the leaf springs 127d, 131d contacts and presses a front wall 96w (see FIG. 12) of the cube shaped space 96h. Due to such a structure, the adjusting block 120 is always biased rearwardly in a direction away from the front wall 96w but is movable within a predetermined range in the direction of the objective optical axis $O_S$ through a guiding mechanism consisting of the guiding rails and grooves 96i, 121i, the extended portion 121e and the rectangular opening 106a. In FIG. 12, each tip of the leaf springs 127d, 131d shown by phantom lines indicates a free state thereof before being bent.

The finder block 96 is provided behind the cube shaped space 96h with a rear wall 96m formed integral with the finder block 96. An adjusting screw 142 shown by phantom lines in FIG. 12 is screwed into the rear wall 96m to pass therethrough in the direction of the objective optical axis $O_S$. The tip of the adjusting screw 142 contacts the adjusting block 120, so that the position of the adjusting block 120 in the cube shaped space 96h in the direction of the objective optical axis $O_S$, i.e., in the forward/rearward direction of the camera 20, can be adjusted by rotating the adjusting screw 142 against the biasing force of the leaf springs 127d, 131d. A finder view or image (not shown) seen through the finder optical system is shifted upwards and downwards in a vertical direction of the camera 20 as the adjusting block 120 moves forwards and rearwards, respectively. Therefore, when a parallax over an acceptable limit thereof in the vertical direction of the camera 20 exists, i.e., when the finder view seen by a photographer deviates substantially from an actual image to be photographed in the vertical direction of the camera 20, the parallax in the vertical direction of the camera 20 can be reduced or substantially eliminated by adjusting the adjusting screw 142.

A prism holding space 96n which is connected with the cube shaped space 96h is formed in the optical path bending portion 96p on the right side as viewed in FIG. 12 or 13. Substantially half of the prism PS is positioned and fixed in the prism holding space 96n. The remaining half of the prism PS extends upwards from the prism holding space 96n and is covered by a prism covering portion 104 (see FIG. 14) integrally formed on the cover 100. The prism PS is provided with an incident surface P1, the aforementioned first and second reflective surfaces P2, P3, and an emitting surface P4. The light emitted from the adjusting block 120 is incident upon the incident surface P1 to enter the prism PS. The first reflective surface P2 reflects light incident thereon upwards at a right angle (90°). The second reflective surface P3 reflects light reflected by the first reflective surface P2 rearward at a right angle (90°). The light reflected by the second reflective surface P3 passes through the emitting surface P4 to proceed toward the eyepiece lens EP. The prism PS having such a structure converts an inverted subject image formed in and projected from the adjusting block 120 into a right vertical image through the first and second reflective surfaces P2, P3 to project the same to the eyepiece lens EP.

The cover 100 is provided behind the emitting surface P4 of the prism PS with an eyepiece holding portion 105 being integrally formed thereon, as shown in FIG. 14. The eyepiece holding portion 105 supports the eyepiece lens EP therein such that the eyepiece lens EP is located behind the emitting surface P4. The eyepiece holding portion 105 is positioned in the finder look-in portion 31, formed on the rear wall 30 of the camera 20. A photographer observes an erected subject image through the eyepiece lens EP. A reference "$O_E$" shown in FIG. 14 designates an optical axis of the eyepiece lens EP.

As can be understood from the foregoing, according to the finder optical system having the aforementioned structure, the light from a subject or subjects to be photographed which is passed through the first, second and third lens elements L1, L2 and L3 is reflected downwardly by the first reflector M1 to be reflected to the adjusting block 120 by the second reflector M2. Subsequently, the light passes through the condenser lens CL and the polarizing plate 140 so that a subject image is formed at or near the contacting surface 137 of the liquid crystal display DP. Thereafter, the formed subject image passes through the polarizing plate 141 and the transparent plate TP to be reflected upwards by the first reflective surface P2, and then the subject image is reflected rearward by the second reflective surface P3 to be observed as an erect image by a photographer through the eyepiece lens EP.

According to the camera 20 having the real image type of finder with the aforementioned structure, dust is prevented from entering in the vicinity of the focal plane without sealing the whole finder optical system, i.e., without sealing all the existing gaps on the finder. In the camera 20 only a small space in the finder around the focal plane, i.e., an enclosed space in the adjusting block 120 prepared separately from the finder block 96, is formed as a dust-proof space, thus a dust-proof structure for preventing dust from entering in the vicinity of the focal plane is realized with a simple structure. In addition, a parallax adjustment can be performed by shifting the adjusting block 120 in a direction perpendicular to a part of the finder optical axis (the optical axis $O_M$), so that the dust-proof structure and the parallax adjusting mechanism are simultaneously realized by the adjusting block 120.

A difference in pressure due to a variation in temperature does not occur between the outside and inside of the adjusting block owing to the sealing members 126, 129 and 133 being made of an air-permeable porous material.

In an assembly of the finder block 96, in order to ensure a clear finder view, it is no longer necessary for the whole finder block 96 to be assembled in a clean room (dust-proof room), but it is sufficient that only the adjusting block 120 be assembled in a clean room, which makes assembly of the camera 20 much easier.

In the case of the adjusting block 120 being rejected or broken, it is not necessary to replace the whole finder block 96 with a new one but replace only the adjusting block 120 with a new one. This results in repairs being made easily.

Each sealing member 126, 129 and 133 formed string-like, i.e., not in the shape of an annular ring without ends, is used in the adjusting block 120. This reduces the cost of the sealing members 126, 129 and 133, as compared with a case of the annular-ring shaped sealing members being used.

In the above embodiment of the camera 20, the adjusting block 120 is shiftable only in the forward/rearward direction of the camera 20 to reduce or substantially eliminate a parallax in the vertical direction of the camera 20. However, with a modified guiding mechanism for the adjusting block 120 that can be easily realized by a person skilled in the art, the adjusting block 120 may be guided to be shiftable not only in the forward/rearward direction of the camera 20 to reduce or substantially erase a parallax in the vertical direction of the camera 20, but also in the vertical direction of the camera 20 to reduce or substantially eliminate a parallax in the right/left direction of the camera 20 (horizontal direction as viewed in FIG. 2 or 3). Moreover, with a further modification of the guiding mechanism that can also be realized by a person skilled in the art, the adjusting block 120 may be shiftable in more than two directions each perpendicular to the optical axis $O_M$.

In the above embodiment of the camera 20 the adjusting block 120 is provided with the liquid crystal display DP, but the adjusting block 120 may be provided with out a liquid crystal display. In this case, it is not necessary to provide the slot 121f, the sealing member 131, etc., but it is sufficient to provide only a finder frame, similar to the finder frame 138, in the vicinity of the focal plane.

In the above embodiment of the camera 20 the adjusting block 120 is provided facing the objective optical system side and facing the eyepiece side thereof with the condenser lens CL and the transparent plate TP, respectively. However, in accordance with a modification of the finder optical system, either of the condenser lens CL or the transparent plate TP may be replaced by any kind of transparent member. For instance, a transparent plate may be provided at either side of the adjusting block 120, a lens may be provided at either side of the adjusting block 120, or a transparent plate may be provided at the objective side end of the adjusting block 120 while a lens may be provided at the eyepiece side end of the adjusting block 120.

Not only the particular type of the film cartridge 1 but also any other type of film cartridge such as a 135 type cartridge may be use The finder a 20.

The finder optical system supported by the finder block is not limited solely to the finder optical system of the aforementioned specific type but may be any other type having a different structure. In the case where the photographic optical system is a fixed focal point optical system, not a zoom lens optical system, the finder optical system may be a fixed focal point optical system.

In the above embodiment of the camera 20 the distance measuring unit 80 for a passive type of AF (autofocus) system is used, however a different type of distance measuring device for an active type of AF system may be used instead. In this case, in the unit block 90 the different type of distance measuring device may be positioned instead of the distance measuring unit 80.

In the above embodiment of the camera 20 the first and second photometric lens 70a, 70b, and the first and second photometering elements 150, 151 are provided as a photometering device, but may be replaced by any other photometering device.

Obvious changes may be made to the specific embodiment of the present invention described herein, such modifications being within the spirit and scope of the invention claimed. It is indicated that all matter contained herein is illustrative and does not limit the scope of the present invention.

What is claimed is:

1. A viewfinder having an objective optical system and an eyepiece optical system, comprising:

a supporting member which supports at least a part of one of said objective optical system and said eyepiece optical system;

a hollow member provided separately from said supporting member, said hollow member being positioned in an optical path of said viewfinder such that a focal plane of said objective optical system is located within an enclosed space defined by said hollow member;

a first transparent member secured to one end of said hollow member, said first transparent member facing toward said objective optical system; and a second transparent member secured to another end of said hollow member, said second transparent member facing toward said eyepiece optical system, wherein the enclosed space in which said focal plane is located is formed by said first transparent member, said second transparent member and said hollow member.

2. The viewfinder according to claim 1, wherein at least one of said first and second transparent members is a lens element.

3. The viewfinder according to claim 2, wherein said lens element is a condenser lens.

4. The viewfinder according to claim 1, wherein at least one of said first and second transparent members is a transparent plate.

5. The viewfinder according to claim 1, wherein said supporting member supports at least a part of said objective optical system and at least a part of said eyepiece optical system.

6. The viewfinder according to claim 1, wherein said hollow member is guided in at least one direction perpendicular to an optical axis of said viewfinder.

7. The viewfinder according to claim 6, wherein said hollow member is biased in said at least one direction by a biasing member.

8. The viewfinder according to claim 7, further comprising an adjusting mechanism for shifting said hollow member in said at least one direction perpendicular to said optical axis against a biasing force of said biasing member.

9. The viewfinder according to claim 8, wherein said adjusting mechanism comprises an adjusting screw which contacts said hollow member.

10. The viewfinder according to claim 1, wherein at least one of said first and second transparent members is secured to said hollow member by a fixing member made of an elastic material which engages with said hollow member.

11. The viewfinder according to claim 10, wherein said hollow member is guided in at least one direction perpendicular to an optical axis of said finder, said hollow member being biased in said at least one direction by a biasing member integrally formed on said fixing member.

12. The viewfinder according to claim 11, further comprising an adjusting mechanism for shifting said hollow member in said at least one direction perpendicular to said optical axis against a biasing force of said biasing member.

13. The viewfinder according to claim 12, wherein said adjusting mechanism comprises an adjusting screw which contacts said hollow member.

14. The viewfinder according to claim 1, further comprising a first sealing member held between at least one of said first and second transparent members and said hollow member.

15. The viewfinder according to claim 14, wherein said first sealing member is made of an air-permeable material, so that air can enter and exit said hollow member through said first sealing member.

16. The viewfinder according to claim 14, wherein said first sealing member is held between said first transparent member and said hollow member.

17. The viewfinder according to claim 14, wherein said first sealing member is held between said second transparent member and said hollow member.

18. The viewfinder according to claim 1, further comprising a liquid crystal display positioned in said enclosed space proximite to said focal plane.

19. The viewfinder according to claim 18, wherein said hollow member comprises a slot formed thereon, and wherein a flexible printed wire, having an end said end connected to said liquid crystal display and passes through said hollow member through said slot.

20. The viewfinder according to claim 19, further comprising a second sealing member held between said slot and said flexible printed wire, so that air can enter and exit said hollow member through said second sealing member.

21. The viewfinder according to claim 20, wherein said second sealing member is made of an air-permeable material.

22. The viewfinder according to claim 1, wherein said objective optical system comprises at least a lens element movable along an optical axis to vary a magnification of said viewfinder.

23. The viewfinder according to claim 1, in combination with a camera.

24. The viewfinder according to claim 23, wherein said camera comprises a zoom lens, and wherein said objective optical system comprises at least a lens element movable along an optical axis to vary a magnification of said viewfinder in accordance with a variation of a focal length of said zoom lens.

25. The viewfinder according to claim 1, further comprising an image inverting prism, said image inverting prism positioned within said viewfinder so that light emitted from said hollow member is incident onto a surface of said image inverting prism.

26. The viewfinder according to claim 1, further comprising a system that mounts said hollow member for parallax compensating movement in a direction transverse to an optical axis of said viewfinder.

27. A real image type of viewfinder having an objective optical system and an eyepiece optical system, a subject image formed by said objective optical system being observed through said eyepiece optical system, said viewfinder comprising:

a supporting base which supports said objective optical system and said eyepiece optical system; and a hollow member assembled separately from said supporting base and positioned in an optical path of said viewfinder such that a focal plane of said objective optical system is located within an enclosed space defined by said hollow member, said hollow member comprising:

a first transparent member secured to one end of said hollow member and facing said objective optical system; and a second transparent member secured to another end of said hollow and facing said eyepiece optical system, wherein the enclosed space in which said focal plane is located is formed by said first transparent member, said second transparent member and said hollow member.

28. The viewfinder according to claim 27, further comprising an image inverting prism, said image inverting prism positioned within said viewfinder so that light emitted from said hollow member is incident onto a surface of said image inverting prism.

29. The viewfinder according to claim 27, further comprising a system that mounts said hollow member for parallax compensating movement in a direction transverse to an optical axis of said viewfinder.

* * * * *